(12) United States Patent
Takagi

(10) Patent No.: US 7,045,555 B2
(45) Date of Patent: May 16, 2006

(54) REGENERATED RESIN COMPOSITION

(75) Inventor: Makoto Takagi, Chiyoda-ku (JP)

(73) Assignee: Teijin Chemicals Ltd., Tokyo (JP)

( * ) Notice: Subject to any disclaimer, the term of this patent is extended or adjusted under 35 U.S.C. 154(b) by 127 days.

(21) Appl. No.: 10/742,388

(22) Filed: Dec. 22, 2003

(65) Prior Publication Data

US 2004/0138378 A1    Jul. 15, 2004

Related U.S. Application Data

(62) Division of application No. 09/979,555, filed as application No. PCT/JP01/02474 on May 27, 2001.

(30) Foreign Application Priority Data

Mar. 28, 2000 (JP) .............................. 2000-088195

(51) Int. Cl.
*C08L 69/00* (2006.01)

(52) U.S. Cl. ............................. 521/48; 521/40; 521/41; 523/343; 524/127; 524/141; 525/67; 525/439; 525/462; 264/37.3; 264/911

(58) Field of Classification Search ............... 264/37.3, 264/911; 523/343; 521/40, 41, 48; 524/127, 524/141; 525/67, 439, 462
See application file for complete search history.

(56) References Cited

U.S. PATENT DOCUMENTS

| 6,369,142 | B1 | 4/2002 | Nodera |
| 6,384,114 | B1 | 5/2002 | Nodera |
| 6,403,683 | B1 | 6/2002 | Kobayashi |
| 6,498,228 | B1 | 12/2002 | Nodera |

FOREIGN PATENT DOCUMENTS

| DE | 42 44 027 | 6/1994 |
| DE | 43 11 138 | 10/1994 |
| EP | 0 531 008 | 3/1993 |
| JP | 5-247328 | 9/1993 |
| JP | 6-298991 | 10/1994 |
| JP | 8-311326 | 11/1996 |
| JP | 2000-159900 | 6/2000 |
| JP | 2001-26719 | 1/2001 |
| JP | 2001-226576 | 8/2001 |
| WO | 95/13322 | 5/1995 |
| WO | 98/49238 | 11/1998 |
| WO | 00/12629 | 3/2000 |

OTHER PUBLICATIONS

Whelan, Developments in Injection Molding I, pp. 160-161 (1970).

*Primary Examiner*—David J. Buttner
(74) *Attorney, Agent, or Firm*—Wenderoth, Lind & Ponack, L.L.P.

(57) ABSTRACT

A regenerated resin composition comprising (I) a molded article pulverized material (Component A) that satisfies conditions
(1) that the molded article pulverized material is a pulverized material of a molded article having an aromatic polycarbonate resin content of 30 to 98% by weight,
(2) that the pulverized material has a viscosity average molecular weight of 17,000 to 30,000, and
(3) that the pulverized material has a wet heat retention ratio of at least 60%, and
(II) an aromatic polycarbonate resin (Component B).

According to the present invention, there is provided a regenerated resin composition that comprises a pulverized material from a molded article made of an aromatic polycarbonate resin and that is excellent in the property of retaining physical properties for a long period of time and excellent in mechanical strength.

16 Claims, No Drawings

REGENERATED RESIN COMPOSITION

This is a divisional of Ser. No. 09/979,555, filed Nov. 26, 2001 now abandoned, which is a 371 of PCT/JP01/02474, filed May 27, 2001.

DETAILED DESCRIPTION OF THE INVENTION

1. Field of the Invention

The present invention relates to a regenerated resin composition. More specifically, it relates to a regenerated resin composition that is excellent in mechanical strength and recycle-efficiency since a pulverized molded article that satisfies specific conditions is used for the regenerated resin composition.

2. Prior Art

An aromatic polycarbonate resin has excellent mechanical properties and thermal properties, so that it is industrially widely used. A great number of polymer alloys prepared by blending an aromatic polycarbonate resin with other thermoplastic resins and flame-retardant polycarbonate resin compositions containing flame retardants for improving flame retardancy have been developed, and these alloys and compositions are widely used in the fields of office automation appliances, electric and electronic machines and equipment, automobiles and other miscellaneous goods. In recent years, the use of a resin composition prepared by incorporating an ABS resin and a flame retardant into an aromatic polycarbonate resin is remarkably increasing in parts such as housing of office automation appliances and electric and electronic machines and equipment, and phosphoric ester is about to constitute a main stream as the flame retardant.

On the other hand, in recent years, a reuse of disused products, so-called "recycle", has been actively studied from the viewpoint of reuse of resources and environmental protection, and the recycling is one of important issues in the field of office automation appliances using a large amount of resins as described above.

For the above recycling of a resin, there have been mainly employed a method in which a collected resin is used in fields where no advanced mechanical properties or flame retardancy is specially required. In recent years, however, it is demanded to accomplish a concept inherent in the term "recycle", that is, a so-called "closed recycle" by allowing a regenerated resin composition to attain properties nearly equivalent to the properties inherent in a resin composition before regeneration. Under the existing circumstances, for this purpose, attempts are made to incorporate a proper amount of a so-called "virgin-resin" into a resin recovered from scrapped products for obtaining a regenerated resin composition having properties close to the properties of a resin composition before the regeneration.

However, accomplishment of the above recycling in the aromatic polycarbonate resin containing other resin or a flame retardant involves the following problems.

1. In a process of collecting and obtaining a resin, appliances to be collected are liable to be placed in an environment where the deterioration of an aromatic polycarbonate resin proceeds.
2. In this case, the presence of a flame retardant, particularly, a phosphoric ester or alkali (alkaline earth) metal salts of an inorganic and an organic acid and other resins can constitute a factor that causes the above deterioration, particularly, promotes hydrolysis, and the deterioration sometimes proceeds to a great extent.
3. When a resin containing the above deteriorating factor or a deteriorated resin is recycled, a regenerated resin composition cannot accomplish the properties nearly equivalent to properties that a member has had before the regeneration. For accomplishing such properties, it is inevitably required to decrease the content of a collected resin, and the recycle-efficiency decreases.
4. Further, environments in which products are used and time periods for which the product are used are not uniform, so that the products differ in degree of final deterioration, and collected resins are liable to vary in quality. For maintaining the properties constantly at a certain level or higher in such a variability range, it is required to set the amount ratio of a collected resin to a virgin-resin in a lower limit value of the variability, which results in a decrease in recycle-efficiency.
5. For improving recycle-efficiency, there may be employed a method in which products are thoroughly managed and collected products are thoroughly managed so that, for example, the collected products are classified into products produced nearly at the same period and formed from the same material to reuse. However, this measure simply increases a recycle cost, which results in a failure in the intended purpose.

On the other hand, concerning the recycling of an aromatic polycarbonate resin, various proposals have been so far made in the field of optical recording medium typified by compact disks (CD). For example, JP-A-8-311326 discloses an aromatic polycarbonate resin composition comprising a pulverized CD material, an aromatic polycarbonate resin and an ABS resin. In the recycling proposed in the above Publication, however, it is not much necessary to attach importance to the above problems. That is, the situation differs in the following points.

(i) CDs, etc., are made mostly of an aromatic polycarbonate resin alone except for a small amount of additives and cause the above deterioration problem in few or almost no cases in principle, so that no or little problem on variability of product quality is caused.

(ii) CDs are made from a resin having low impact resistance, and the composition of a regenerated resin composition is designed on the basis of the above property.

With regard to an aromatic polycarbonate resin containing a flame retardant such as phosphoric ester or various salts or other resin such as an ABS resin or a polyester resin, therefore, there are demanded a method of effective recycling thereof and a regenerated resin composition having good properties. Under the present conditions, however, no proposal therefor has been found.

That is, there is strongly demanded a regenerated resin composition which is a product regenerated from widely collected disused molded articles made of resin compositions containing a polycarbonate resin, which is excellent in recycle-efficiency and which has good mechanical strength sufficient for application of the regenerated resin composition to a variety of products.

PROBLEMS TO BE SOLVED BY THE INVENTION

It is an object of the present invention to provide a regenerated resin composition that permits a high recycle-efficiency and properties nearly equivalent to the properties of a member before the regeneration when the regenerated resin composition is produced by collecting molded articles made of resin compositions containing an aromatic polycarbonate resin and mixing the thus-collected resin with other virgin-resin.

The present inventor has made diligent studies and as a result has found that the above problems can be overcome by using, as a pulverized material from collected molded articles, a pulverized molded article material satisfying specific conditions with regard to a molecular weight and wet heat resistance and preparing a resin composition from such a pulverized molded article material and an aromatic polycarbonate resin.

MEANS TO SOLVE THE PROBLEMS

According to the present invention, the above object is achieved by a regenerated resin composition comprising
(I) a molded article pulverized material (Component A) that satisfies conditions
(1) that the pulverized molded article material is a pulverized material of a molded article having an aromatic polycarbonate resin content of 30 to 98% by weight,
(2) that the pulverized material has a viscosity average molecular weight of 17,000 to 30,000, and
(3) that the pulverized material has a wet heat retention ratio of at least 60%, and
(II) an aromatic polycarbonate resin (Component B).

The regenerated resin composition of the present invention will be explained further in detail hereinafter.

The molded article pulverized material as Component A in the present invention will be explained. The molded article pulverized material for use in the present invention does not impose any special limitation on properties required of a product formed of a molded article, such as the use field, form and color of the molded article and use period and environment of the molded article. Further, the pulverized material shall not be limited to a pulverized material prepared from a specific molded article, and pulverized materials prepared from at least one kind of molded article may be mixed for use.

In the present invention, the "molded article" for Component A includes ① a molded article that is commercially used as part of a product and collected after completion of period of use of the product by a consumer and ② a molded article obtained by molding pellets of a virgin resin at least once in a molding step, such as an inferior product that takes place in the steps of producing a product or a molded article collected as a product in store in the process of distribution. Incidental molded articles such as a product made on an experimental basis, an inferior product, a sprue and a runner that take place in the steps of molding may be incorporated in the regenerated resin composition to such an extent that the incorporation is generally carried out in the industry of molded articles.

In the present specification, Titles of Components and Contents of Components have the following meanings.

| Title of Component; | Content of Component |
|---|---|
| Component A | Pulverized material of molded article |
| Component A-1; | Polycarbonate resin in Component A |
| Component A-2-PS; | Styrene-based resin in Component A |
| Component A-2-PE; | Aromatic polyester resin in Component A |
| Component A-3; | Flame retardant in Component A |

-continued

| Title of Component; | Content of Component |
|---|---|
| Component A-3-a; | Phosphoric ester as flame retardant in Component A |
| Component A-3-b; | Organic siloxane compound as flame retardant in Component A |
| Component A-3-c; | Alkali (alkaline earth) metal salt as flame retardant in Component A |
| Component A-4; | Impact modifier in Component A |
| Component A-5; | Inorganic filler in Component A |
| Component B; | Virgin polycarbonate resin |
| Component C; | Regenerated resin composition |
| Component C-1; | Polycarbonate resin in Component C |
| Component C-2-PS; | Styrene-based resin in Component C |
| Component C-2-PE; | Aromatic polyester resin in Component C |
| Component C-3; | Flame retardant in Component C |
| Component C-3-a; | Phosphoric ester as flame retardant in Component C |
| Component C-3-b; | Organosiloxane compound as flame retardant in Component C |
| Component C-3-c; | Alkali (alkaline earth) metal salt as flame retardant in Component C |
| Component C-4; | Impact modifier in Component C |
| Component C-5; | Inorganic filler in Component C |

The molded article pulverized material (Component A) is a material containing 30 to 98% by weight of an aromatic polycarbonate resin (Component A-1). Further, it is required to use a pulverized material having (1) a viscosity average molecular weight, to be defined later, of 17,000 to 30,000 and (2) a wet heat retention ratio, to be defined later, of at least 60%.

When the content of the aromatic polycarbonate resin (Component A-1) in the pulverized material (Component A) is 30 to 98% by weight, preferably 40 to 90% by weight, the effect of the present invention is exhibited. The content of an aromatic polycarbonate resin in the molded article pulverized material as Component A can be analyzed by any combination of an isolation method such as alkali decomposition treatment, pyrolysis treatment or solvent extraction treatment with a method of comparing specific peaks on the basis of relative intensities such as IR analysis, NMR analysis, pyrolysis gas chromatography, infrared analysis, UV analysis, SIMS analysis or ESCA analysis, and such a content can be easily determined.

Further, Component A has a viscosity average molecular weight of 17,000 to 30,000, preferably 18,000 to 26,000. When the viscosity average molecular weight is lower than 17,000, the amount ratio of Component A to a virgin resin for increasing the mechanical strength of a regenerated resin composition is low, and the recycle efficiency is not fully high. Further, when a resin composition before regeneration is caused to have a low molecular weight due to deterioration, such a deteriorated composition is a factor to deteriorate a regenerated resin composition and can promote deterioration during the production of the regenerated resin composition, so that it is difficult to attain mechanical strength, etc., stably. When the viscosity average molecular weight is higher than 30,000, moldability decreases, so that a thermal load during the production of a regenerated resin composition undesirably increases, and when the amount ratio of Component A is therefore decreased, the recycle-efficiency is caused to decrease.

The viscosity average molecular weight for identifying the above Component A is determined as follows. First, Component A that is a molded article pulverized material is dissolved in methylene chloride having a weight 20 to 30 times the weight of Component A, a soluble content is sampled by Celite filtration, then, the solvent is fully removed, and the remainder is dried, to obtain a methylene-chloride-soluble solid. A solution of 0.7 g of the above solid in 100 ml of methylene chloride is used to determine a specific viscosity at 20° C., which is calculated on the basis of the following equation, with an Ostwald viscometer.

Specific viscosity $(\eta_{SP}) = (t-t_0)/t_0$ wherein $t_0$ is a time period that dropping of methylene chloride takes by the second and t is a time period that dropping of a sample solution takes by the second.

Further, the above-determined specific viscosity is substituted in the following equation, to determine a viscosity average molecular weight M.

$\eta_{SP}/c = [\eta] + 0.45 \times [\eta]^2 c [\eta] = 1.23 \times 10^{-4} M^{0.83} c = 0.7$ On the other hand, the wet heat retention ratio defined for identifying Component A in the present invention refers to a value defined by the following equation on the basis of the above viscosity average molecular weight obtained by allowing a molded article pulverized material under a wet heat pressure-elevated environment of 120° C. and 100% RH for 24 hours measuring the thus-treated pulverized material.

Wet heat retention ratio (%)=(viscosity average molecular weight after the wet heat treatment/viscosity average molecular weight before the wet heat treatment)×100.

When the above wet heat retention ratio is less than 60%, a molded article from a regenerated resin composition comes to have low mechanical properties. That is because a material failing to satisfy the above wet heat retention ratio is liable to cause deterioration during the production of a regenerated resin composition. More preferred is a material having the above wet heat retention ratio of at least 70%.

The present invention uses a molded article pulverized material (Component A) containing a specific amount of an aromatic polycarbonate resin, having a specific viscosity average molecular weight and having the wet heat retention ratio specified in the present invention. A molded article pulverized material satisfying the above conditions can be easily selected by the above simple method, and a collected resin composition containing an aromatic polycarbonate resin and having a variety of product qualities and/or compositions can be remarkably effectively utilized. And, a regenerated resin composition obtained by mixing such a collected resin composition with an aromatic polycarbonate resin (Component B) that is a virgin-resin can stably accomplish excellent mechanical properties.

While the form of the molded article pulverized material as Component A in the present invention is not critical, preferably, a pulverized material having a maximum-particle major diameter in the range of from 1 to 30 mm is preferred in view of processability and handling properties. A collected molded article can be pulverized with a known pulverizing machine. For example, the pulverizing machine can be selected from a rotary cutter mill, a roll crusher, a hammer crusher, a disk mill, a pin mill, a turbo mill or a jet mill.

The amount ratio of Component A in the regenerated resin composition (Component C) per 100% by weight of the regenerated resin composition is preferably 5 to 60% by weight. It is more preferably 6 to 50% by weight, still more preferably 7 to 40% by weight, yet more preferably 10 to 40% by weight, particularly preferably 10 to 35% by weight. When the amount ratio of Component A is 5 to 60% by weight, excellent recycle efficiency can be accomplished together with excellent mechanical properties and long-lasting properties.

The content of the aromatic polycarbonate resin (Component B) in the regenerated resin composition (Component C) is 5 to 90% by weight, preferably 10 to 85% by weight, particularly preferably 20 to 85% by weight based on the composition.

The pulverized material (Component A) is preferably a material prepared by removing those components which are other than the resin composition and are derived from surface processing of a molded article, such as a printing film, a seal, a label, a face coating film, a conductive coating, a conductive plating, vapor deposition, etc., such that the content thereof in the pulverized material is 1% by weight or less, and pulverizing the molded article. When higher impact resistance is particularly demanded, the above is a more preferred requirement.

The method of removing the above surface-coating components such as a printing film and a plating includes a method of rolling a material between two rolls, a method of brining a material into contact with hot pressurized water, various solvent or an acid or alkaline aqueous solution, a method of scraping such a coating film portion off, a method of exposing a material to ultrasonic waves and a blasting method. These methods can be used in combination.

While the molded article pulverized material as Component A may be a material substantially made of an aromatic polycarbonate resin alone, a usual molded article pulverized material contains other components in addition to an aromatic polycarbonate resin. Although not specially limited, examples of the other components include a thermoplastic resin, a flame retardant, a dripping preventing agent, a reinforcing filler, an impact modifier, a lubricant, a stabilizer, a colorant, an ultraviolet absorbent, an antioxidant and a mold release agent. A pulverized material of a molded article particularly containing a flame retardant and other thermoplastic resin can be preferably used in that an excellent regenerated resin composition is obtained.

Preferred embodiments of components and compositions other than an aromatic polycarbonate resin in the molded article pulverized material as Component A will be explained below.

In addition to an aromatic polycarbonate resin (Component A-1), preferably, Component A in the present invention contains a styrene-based resin (Component A-2-PS) or an aromatic polyester resin (Component A-2-PE). In this case, advantageously, the content of the styrene-based resin (Component A-2-PS) or the aromatic polyester resin (Component A-2-PE) in Component A is 1 to 65% by weight, preferably 5 to 50% by weight, particularly preferably 10 to 40% by weight.

In addition to the aromatic polycarbonate resin (Component A-1) and the styrene-based resin (Component A-2-PS) or the aromatic polyester resin (Component A-2-PE), the Component A in the present invention may contain a flame retardant (Component A-3). As a flame retardant (Component A-3), preferred is a phosphoric ester (Component A-3-a), an organosiloxane compound (Component A-3-b) or an alkali (alkaline earth) metal salt (Component A-3-c) for an object of the present invention. The content of each of the flame retardants of the above three types in the Component A has a preferred range. The content of the phosphoric ester (Component A-3-a) in Component A is preferably in the range of from 1 to 30% by weight, particularly preferably in the range of from 5 to 20% by weight. When the flame retardant is the organosiloxane compound (Component A-3- b), the content thereof in Component A is preferably 0.01 to 10% by weight, more preferably 0.1 to 5% by weight, particularly preferably 0.5 to 3% by weight. When the flame retardant is the alkali (alkaline earth) metal salt (Component A-3-c), the content thereof in Component A is preferably 0.0005 to 1% by weight, more preferably 0.001 to 0.2% by weight, particularly preferably 0.002 to 0.1% by weight.

Examples of composition of Component A preferably include the following compositions (I), (II) and (III), and particularly preferably include the following compositions (I) and (II).

Preferred Composition (I) for Component A

A molded article pulverized material formed of a composition containing the following components (1) to (5), (1) 30 to 98% by weight, preferably, 40 to 90% by weight, of the aromatic polycarbonate resin (Component A-1), (2) 1 to 65% by weight, preferably 5 to 50% by weight, of the styrene-based resin (Component A-2-PS), (3) (a) 1 to 30% by weight, preferably 5 to 20% by weight, of the phosphoric ester (Component A-3-a), (b) 0.01 to 10% by weight, preferably 0.1 to 5% by weight, of the organosiloxane compound (Component A-3-b), or (c) 0.0005 to 1% by weight, preferably 0.001 to 0.2% by weight, of the alkali (alkaline earth) metal salt (Component A-3-c), (4) 0 to 20% by weight, preferably 0.5 to 20% by weight, more preferably 1 to 15% by weight, of the impact modifier (component A-4), (5) 0 to 60% by weight, preferably 1 to 60% by weight, more preferably 2 to 50% by weight, of the reinforcing filler (Component A-5).

Preferred Composition (II) for Component A

A molded article pulverized material formed of a composition containing the following components (1) to (5), (1) 30 to 98% by weight, preferably, 40 to 90% by weight, of the aromatic polycarbonate resin (Component A-1), (2) 1 to 65% by weight, preferably 5 to 50% by weight, of the aromatic polyester resin (Component A-2-PE), (3) (a) 1 to 30% by weight, preferably 5 to 20% by weight, of the phosphoric ester (Component A-3-a), (b) 0.01 to 10% by weight, preferably 0.1 to 5% by weight, of the organosiloxane compound (Component A-3-b), or (c) 0.0005 to 1% by weight, preferably 0.001 to 0.2% by weight, of the alkali (alkaline earth) metal salt (Component A-3-c), (4) 0 to 20% by weight, preferably 0.5 to 20% by weight, more preferably 1 to 15% by weight, of the impact modifier (component A-4), and (5) 0 to 60% by weight, preferably 1 to 60% by weight, more preferably 2 to 50% by weight, of the reinforcing filler (Component A-5).

Preferred Composition (III) for Component A

A molded article pulverized material formed of a composition containing the following components (1) to (4), (1) 50 to 98% by weight, preferably, 55 to 98% by weight, of the aromatic polycarbonate resin (Component A-1), (2) (a) 1 to 30% by weight, preferably 5 to 20% by weight, of the phosphoric ester (Component A-3-a), (b) 0.01 to 10% by weight, preferably 0.1 to 5% by weight, of the organosiloxane compound (Component A-3-b), or (c) 0.0005 to 1% by weight, preferably 0.001 to 0.2% by weight, of the alkali (alkaline earth) metal salt (Component A-3-c), (3) 0 to 20% by weight, preferably 0.5 to 20% by weight, more preferably 1 to 15% by weight, of the impact modifier (component A-4), and (4) 0 to 30% by weight, preferably 1 to 30% by weight, more preferably 2 to 25% by weight, of the reinforcing filler (Component A-5).

The aromatic polycarbonate resin as Component B in the present invention will be explained below. Component B in the present invention is a resin obtained by polymerization and is in the state of a powder or pellets obtained by granulation, and it refers to a so-called virgin aromatic polycarbonate resin that is not yet formed into a molded article. Component B is therefore clearly distinguished from that Component A in the present invention which is once used on a market and collected as a molded article.

In the present invention, when the regenerated resin composition (Component C) is prepared, Component A and Component B can be mixed in the above amount ratio. Further, other additives different from Component B can be incorporated. Examples of the above "other" additives include other thermoplastic resin, a flame retardant, a dripping preventing agent, a reinforcing filler, an impact modifier, a lubricant, a stabilizer, a colorant, an ultraviolet absorbent, an antioxidant, a mold release agent, an antimicrobial, an anti-mold agent and an antistatic agent. These may be incorporated as required depending upon properties of a regenerated resin composition as an end product.

The present invention uses Component A that satisfies the specific conditions and aims preferably at providing a regenerated resin composition that can be used in the field where a molded article for Component A prior to pulverization is used. Therefore, the regenerated resin composition (Component C) of the present invention preferably has a composition similar to the composition of Component A. More preferably, the amount ratio of each of the aromatic polycarbonate resin, the styrene-based resin, the aromatic polyester resin and the flame retardant in Component C is preferably in the range of from 0.7 to 1.5 times the content of each in Component A, more preferably in the range of from 0.75 to 1.45 times, still more preferably 0.8 to 1.35 times. It is preferred to incorporate the above Component B and virgin additives other than Component B such that the above amount ratio can be attained.

According to studies made by the present inventor, preferably, it has been found that it is proper to mix Component A and Component B in the above amount ratio to obtain a regenerated resin composition (Component C) of the present invention having the following composition (I), (II) or (III) as an end product, and that a molded article excellent in a long-term stability of physical properties and mechanical strength can be obtained. The regenerated resin composition particularly preferably has the following composition (I) and (II).

Preferred Regenerated Resin Composition (I)

(1) 30 to 96% by weight, preferably 35 to 90% by weight, more preferably 45 to 90% by weight, still more preferably 55 to 90% by weight, of an aromatic polycarbonate resin (Component C-1), (2) 3 to 40% by weight, preferably 5 to 35% by weight, more preferably 5 to 30% by weight, of a styrene-based resin (Component C-2-PS), and (3) 0.01 to 30% by weight, preferably 0.01 to 20% by weight of a flame retardant (Component C-3).

Further, desirably, the above regenerated resin composition (I) contains 0.5 to 20% by weight, preferably 1 to 15% by weight, of an impact modifier (Component C-4). Further, the above regenerated resin composition (I) may contain 1 to 60% by weight, preferably 2 to 50% by weight, particularly preferably 3 to 45% by weight, of a reinforcing filler (Component C-5). Properly, the flame retardant (Component C-3) in the above regenerated resin composition (I) is a phosphoric ester (Component C-3-a), and advantageously, the content thereof is 1 to 30% by weight, preferably 2 to 20% by weight, more preferably 5 to 20% by weight, still more preferably 5 to 15% by weight.

Preferred Regenerated Resin Composition (II)

(1) 30 to 96% by weight, preferably 35 to 90% by weight, more preferably 45 to 90% by weight, still more preferably 35 to 90% by weight, of an aromatic polycarbonate resin (Component C-1), (2) 3 to 40% by weight, preferably 5 to 35% by weight, more preferably 5 to 30% by weight of an aromatic polyester resin (Component C-2-PE), and (3) 0.01 to 30% by weight, preferably 0.01 to 20% by weight of a flame retardant (Component C-3).

Further, desirably, the above regenerated resin composition (II) contains 0.5 to 20% by weight, preferably 1 to 15% by weight, of an impact modifier (Component C-4). Further, the above regenerated resin composition (II) may contain 1 to 60% by weight, preferably 2 to 50% by weight, particularly preferably 3 to 45% by weight, of a reinforcing filler (Component C-5).

Properly, the flame retardant (Component C-3) in the above regenerated resin composition (II) is a phosphoric ester (Component C-3-a), and advantageously, the content thereof is 1 to 30% by weight, preferably 2 to 20%. by weight, more preferably 5 to 20% by weight, still more preferably 5 to 15% by weight.

Preferred Regenerated Resin Composition (III)

(1) 50 to 98% by weight, preferably 55 to 98% by weight, of an aromatic polycarbonate resin (Component C-1), (2) 0.01 to 30% by weight, preferably 0.01 to 20% by weight of a flame retardant (Component C-3), and (3) 0 to 20% by weight, preferably 1 to 15% by weight, of an impact modifier (Component C-4).

The above regenerated resin composition (III) may contain 1 to 30% by weight, preferably 2 to 25% by weight, of a reinforcing filler (Component C-5).

Properly, the flame retardant (Component C-3) in the above regenerated resin composition (III) is a phosphoric ester (Component C-3-a), and advantageously, the content thereof is 1 to 30% by weight, preferably 2 to 20% by weight, more preferably 5 to 20% by weight, still more preferably 5 to 15% by weight.

The above regenerated resin compositions (I), (II) and (III) according to the present invention are preferred compositions, and molded articles formed from these compositions have excellent physical properties. That is, molded articles formed from the above compositions have a wet heat retention ratio of at least 60% and at least 70% under suitable conditions, and they satisfy V-0 under suitable conditions when tested for flame retardancy according UL94. Further, the molded articles exhibit an impact value retention ratio of at least 60%, or at least 70% under suitable conditions.

With regard to Component A, Component B and Component C in the present invention, the resin, flame retardant, impact modifier, inorganic filler and other additives will be explained below.

The aromatic polycarbonate resin (Component A-1, Component B and Component C-1) includes, for example, a resin obtained from a dihydric phenol and a carbonate precursor by an interfacial polycondensation method or a melting ester interchange method, a resin obtained by polymerizing a carbonate prepolymer according to a solid-phase ester interchange method and a resin obtained from a cyclic carbonate compound by a ring-opening polymerization method.

Typical examples of the dihydric phenol used in this case include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (generally called "bisphenol A"), 2,2-bis{(4-hydroxy-3-methyl)phenyl}propane, 2,2-bis{(4-hydroxy-3,5-dimethyl)phenyl}propane, 2,2-bis{(4-hydroxy-3,5-dibromo)phenyl}propane, 2,2-bis{(3-isopropyl-4-hydroxy)phenyl}propane, 2,2-bis{(4-hydroxy- 3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenyl sulfoxide, 4,4'-dihydroxydiphenyl sulfide, 4,4'-dihydroxydiphenyl ketone, 4,4'-dihdyroxydiphenyl ether and 4,4'-dihydroxydiphenyl ester. These may be used alone or as a mixture of at least two compounds thereof.

Of these, preferred is a homopolymer or a copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene. Particularly, a homopolymer of bisphenol A and a copolymer from 1,1-bis(4-hydroxyphenyl)-3,3,5-trimethylcyclohexane and bisphenol A, 2,2-bis{(4-hydroxy-3-methyl)phenyl}propane or α,α'-bis(4-hydroxyphenyl)-m-diisopropylbenzene are preferred.

The carbonate precursor is selected from carbonyl halide, carbonate ester or haloformate, and specifically, it is selected from phosgene, diphenylcarbonate or dihaloformate of dihydric phenol.

When the above dihydric phenol and the above carbonate precursor are reacted by an interfacial polymerization method or a melt ester interchange method to produce an aromatic polycarbonate resin, a catalyst, a terminal capping agent, an antioxidant for the dihydric phenol, etc., may be used as required. Further, the aromatic polycarbonate resin may be a branched polycarbonate resin obtained by copolymerization of a trifunctional or higher aromatic compound, or it may be a polyester carbonate resin obtained by copolyermization of an aromatic or aliphatic difunctional carboxylic acid. Further, it may be a mixture containing two or more aromatic polycarbonate resins obtained.

The trifunctional or higher aromatic compound include phloroglucin, phloroglucide, trisphenols such as 4,6-dimethyl-2,4,6-tris(4-hydroxyphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1- bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid and benzophenonetetracarboxylic acid and an acid chloride of trimellitic acid, pyromellitic acid or benzophenonetetracarboxylic acid. Of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

When a polyfuncitonal compound that forms a branched polycarbonate resin is used, the content thereof based on the total amount of the aromatic polycarbonate resin is 0.001 to 1 mol %, preferably 0.005 to 0.5 mol %, particularly preferably 0.01 to 0.3 mol %. In a melt ester interchange method in particular, a branched structure sometimes occurs due to a side reaction, and the content of such a branched structure based on the total amount of the aromatic polycarbonate resin is also 0.001 to 1 mol %, preferably 0.005 to 0.5 mol %, particularly preferably 0.01 to 0.3 mol %. The above contents can be calculated on the basis of $^1$H-NMR measurement.

In the interfacial polycondensation method, generally, a dihydric phenol and phosgene are reacted, and the reaction is carried out in the presence of an acid binder and an organic solvent. The acid binder is selected, for example, from alkali metal hydroxide such as sodium hydroxide or potassium hydroxide, or an amine compound such as pyridine. The organic solvent is selected, for example, from hydrocarbon halides such as methylene chloride and chlorobenzene. For promoting the reaction, a catalyst may be used, and it is selected, for example, from a tertiary amine, a quaternary ammonium compound and a quaternary phosphonium compound typified by triethylamine, tetra-n-butylammonium bromide or tetra-n-butylphosphonium bromide. In this case, preferably, the reaction temperature is generally 0 to 40° C., the reaction time period is approximately 10 minutes to 5 hours, and the pH during the reaction is maintained at 9 or higher.

In the above polymerization, generally, a terminal. capping agent is used. The terminal capping agent can be selected from monofunctional phenols. The monofunctional phenols are generally used as a terminal capping agent for adjusting a molecular weight, and commonly include phenol and lower-alkyl-substituted phenols, such as monofunctional phenols of the following general formula (I).

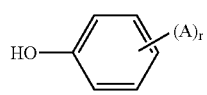

(I)

wherein A is a hydrogen atom or a linear or branched alkyl group or phenyl group-substituted alkyl group having 1 to 9 carbon atoms, and r is an integer of 1 to 5, preferably 1 to 3.

Specific examples of the above monofunctional phenols include phenol, p-tert-butylphenol, p-cumylphenol and isooctylphenol.

Other monofunctional phenols include phenols or benzoic acid chlorides having a long-chain alkyl group or an aliphatic polyester group as a substituent, or long-chain alkylcarboxylic acid chlorides. Of these, phenols having a long-chain alkyl group as a substituent, represented by the following general formulae (2) and (3), are preferably used.

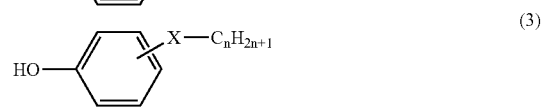

wherein X is —R—CO—O— or —R—O—CO— in which R is a single bond or a divalent aliphatic hydrocarbon group having 1 to 10 carbon atoms, preferably 1 to 5, and n is an integer of 10 to 50.

In the above substituted phenols of the general formula (2), n is preferably 10 to 30, particularly preferably 10 to 26. Specific examples thereof include decylphenol, dodecylphenol, tetradecylphenol, hexadecylphenol, octadecylphenol, eicosylphenol, docosylphenol and triacontylphenol.

In the substituted phenols of the general formula (3), properly, X is —R—CO—O— and R is a single bond is proper, and n is preferably 10 to 30, particularly preferably 10 to 26. Specific examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate. The above terminal capping agent may be used alone or in combination.

The reaction in the melt ester interchange method is generally a reaction of ester interchange between a dihydric phenol and carbonate ester, and the reaction is carried out by mixing the dihydric phenol and the carbonate ester under heat in the presence of an inert gas and distilling off an alcohol or phenol that is formed. Although differing depending upon a boiling point of the alcohol or phenol that is formed, the reaction temperature is generally in the range of from 120 to 350° C. In a later stage of the reaction, the reaction system is pressure-reduced to approximately $1.33 \times 10^3$ to 13.3 Pa, to ease distilling off the alcohol or phenol. The reaction time period is generally approximately 1 to 4 hours.

The carbonate ester includes esters of an optionally substituted aryl group or aralkyl group having 6 to 10 carbon atoms, or an alkyl group having 1 to 4 carbon atoms. Specific examples thereof include diphenyl carbonate, bis(chlorophenyl) carbonate, dinaphthyl carbonate, bis(diphenyl) carbonate, dimethyl carbonate, diethyl carbonate and dibutyl carbonate, and of these, diphenyl carbonate is preferred.

For increasing the polymerization rate, a polymerization catalyst may be used. For example, the polymerization catalyst can be selected from catalysts that are generally used for esterification or ester interchange, such as alkali metal compounds such as sodium hydroxide, potassium hydroxide and sodium salt or potassium salt of dihydric phenol, alkaline earth metal compounds such as calcium hydroxide, barium hydroxide and magnesium hydroxide, nitrogen-containing basic compounds such as tetramethylammonium hydroxide, tetraethylammonium hydroxide, trimethylamine and triethylamine, alkoxides of alkali metals or alkaline earth metals, organic acid salts of alkali metals or alkaline earth metals, zinc compounds, boron compounds, aluminum compounds, silicon compounds, germanium compounds, organotin compounds, lead compounds, osmium compounds, antimony compounds, manganese compounds, titanium compounds and zirconium compounds. These catalysts may be used alone or in combination. The amount of the above polymerization catalyst per mole of the dihydric phenol as a raw material is preferably in the range of from $1 \times 10^{-8}$ to $1 \times 10^{-3}$ equivalent, preferably, from $1 \times 10^{-7}$ to $5 \times 10^{-4}$ equivalent.

In the above polymerization, for decreasing a phenolic terminal group, for example, a compound such as bis (chlorophenyl) carbonate, bis(bromophenyl) carbonate, bis (nitrophenyl) carbonate, bis(phenylphenyl) carbonate, chlorophenylphenyl carbonate, bromophenylphenyl carbonate, nitrophenylphenyl carbonate, phenylphenyl carbonate, methoxycarbonylphenylphenyl carbonate or ethoxycarbonylphenylphenyl carbonate may be added in a later stage of the polymerization or after the polymerization. Of these, 2-chlorophenylphenyl carbonate, 2-methoxycarbonylphenylphenyl carbonate and 2-ethoxycarbonylphenylphenyl carbonate are preferred, and 2-methoxycarbonylphenylphenyl carbonate is particularly preferred.

In the above polymerization, further, it is preferred to use a deactivator for neutralizing the activity of the catalyst. Specific examples of the deactivator include benzenesulfonic acid, p-toluenesulfonic acid, sulfonates such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate; and compounds such as trifluoromethanesulfonic acid, naphthalenesulfonic acid, sulfonated polystyrene, a methyl acrylate-sulfonated styrene copolymer, 2-phenyl-2-propyl dodecylbenzenesulfonate, 2-phenyl-2-butyl dodecylbenzenesulfonate, octylsulfonic acid tetrabutyl phosphonium salt, decylsulfonic acid tetrabutylphosphonium salt, benzenesulfonic acid tetrabutylphosphonium salt, dodecylbenzenesulfonic acid tetraethylphosphonium salt, dodecylbenzenesulfonic acid tetrabutylphosphonium salt, dodecylbenzenesulfonic acid tetrahexylphosphonium salt, dodecylbenzenesulfonic acid tetraoctylphosphonium salt, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzylsulfate, tetraethylammonium dodecylbenzylsulfate and tetramethylammonium dodecylbenzylsulfate, although the deactivator shall not be limited thereto. These compounds may be used in combination of at least two compounds of them.

Of the above deactivators, phosphonium salt or ammonium salt type deactivators are preferred. The amount per mole of the residual catalyst is preferably 0.5 to 50 mol, and the amount based on a polycarbonate resin to be produced by polymerization is 0.01 to 500 ppm, more preferably 0.01 to 300 ppm, particularly preferably 0.01 to 100 ppm.

The molecular weight of the aromatic polycarbonate resin is not critical. In the aromatic polycarbonate resin for use as Component B, when the molecular weight is less than 14,000, the impact resistance, etc., are low, and when it exceeds 40,000, the moldability is low. Therefore, an aromatic polycarbonate resin having a viscosity average molecular weight of 14,000 to 40,000 is preferred, and an aromatic polycarbonate resin having a viscosity average molecular weight of 17,000 to 35,000 is particularly preferred. At least two aromatic polycarbonate resins having different molecular weights may be mixed.

The term "viscosity average molecular weight" used in the present invention is a viscosity average molecular weight M obtained by measuring a solution of 0.7 g of an aromatic polycarbonate resin at 20° C. in 100 ml of methylene chloride with an Ostwald viscometer to determine a specific viscosity ($\eta_{SP}$) and substituting the above-determined specific viscosity ($\eta_S$) in the following equation.

$$\eta_{SP}/c = [\eta] + 0.45 \times [\eta]^2 c [\eta] = 1.23 \times 10^{-4} M^{0.83} c = 0.7$$

While Components A and C in the present invention are required to contain the aromatic polycarbonate resin in the already described amount ranges, they may contain other thermoplastic resin. Although not specially limited, examples of the "other" thermoplastic resin include aromatic polyester resins such as a polyethylene terephthalate resin and a polybutylene terephthalate resin; and styrene-based resins such as polystyrene, an AS resin, an ABS resin, an ASA resin and an AES resin. In addition to these, examples thereof include a polyamide resin, an acrylic resin, polyolefin resins such as a polyethylene resin and a polypropylene resin. Further, examples thereof include engineering plastics such as polyphenylene ether and polyacetal and so-called super engineering plastics such as polyether ether ketone, polyetherimide, polyetheramide, polysulfone, polyethersulfone and polyether sulfide.

Of the above "other" thermoplastic resins, a styrene-based resin (Component A-2-PS or C-2-PS) and an aromatic polyester resin (Component A-2-PE or C-2-PE) are particularly preferred. As the aromatic polyester resin, a polyethylene terephthalate resin or a polybutylene terephthalate resin is preferred. Further, the styrene-based resin is particularly preferably as the "other" thermoplastic resin in the present invention, and specific compounds thereof will be explained below.

The styrene-based resin (Component A-2-PS or C-2-PS) in the present invention includes a homopolymer or copolymer of styrene or a styrene derivative such as α-methylstyrene or p-methylstyrene and a copolymer of such a monomer and a vinyl monomer such as acrylonitrile or methyl methacrylate. Further, the above styrene-based resin includes graft polymers obtained by graft-polymerization of diene-based rubbers such as polybutadiene, an ethylene-propylene based rubber, an acrylic based rubber, or a composite rubber (IPN rubber) having a structure formed of a polyorganosiloxane rubber component and a polyalkyl (meth)acrylate rubber component that are intricately entangled with each other with styrene and/or a styrene derivative or with styrene and/or a styrene derivative and other vinyl monomer.

Specific examples of the above styrene-based resin include polystyrene, a styrene-butadiene-styrene copolymer (SBS), a hydrogenated styrene-butadiene-styrene copolymer (hydrogenated SBS), a hydrogenated styrene-isoprene-styrene copolymer (hydrogenated SIS), high-impact polystyrene (HIPS), an acrylonitrile-styrene copolymer (AS resin), an acrylonitrile-butadiene-styrene copolymer (ABS resin), a methyl methacrylate-butadiene-styrene copolymer (MBS resin), a methyl methacrylate-acrylonitrile-butadiene-styrene copolymer (MABS resin), an acrylonitrile-acrylic rubber-styrene copolymer (AAS resin), an acrylonitrile-ethylenepropylene-based rubber-styrene copolymer (AES resin) and a styrene-IPN rubber copolymer, and mixtures of these are also included.

The above styrene-based resin may have high stereoregularity like syndiotactic polystyrene formed on the basis of catalytic activity of a metallocene catalyst during its production. Further, it may be a polymer or copolymer having a narrow molecular weight distribution, a block copolymer or a polymer or copolymer having high stereoregularity, obtained by methods such as an anion living polymerization or radical living polymerization. Further, there may be used a copolymer formed by copolymerizing the above styrene-based resin with a compound having a functional group such as maleic acid anhydride or N-substituted maleimide for improving the styrene-based resin in compatibility with the polycarbonate resin.

Of these, an acrylonitrile-styrene copolymer (AS resin) and an acrylonitrile-butadiene-styrene copolymer (ABS resin) are preferred. Further, the styrene-based resins may be used in combination of at least two of them.

The above AS resin is a thermoplastic copolymer obtained from a vinyl cyanide compound and an aromatic vinyl compound by copolymerization. As the above vinyl cyanaide compound, acrylonitrile is particularly preferred. The aromatic vinyl compound can be selected from those described above, and styrene and α-methylstyrene are preferred. Concerning the content of each component in the AS resin when the entire weight of the AS resin is 100% by weight, the content of the vinyl cyanide compound is 5 to 50% by weight, preferably 15 to 35% by weight, and the content of the aromatic vinyl compound is 95 to 50% by weight, preferably 85 to 65% by weight. The other copolymerizable vinyl compound described above may be copolymerized with the above vinyl compounds. The content thereof is preferably 15% by weight or less based on the AS resin components. Further, a variety of initiators, chain transfer agents, etc., that are known can be used for the above reaction.

While the above AS resin may be a resin that is produced by any one of a bulk polymerization method, a suspension polymerization method and an emulsion polymerization method, an AS resin produced by bulk polymerization is preferred. The copolymerization method may employ any one of employ one-step copolymerization and multi-step copolymerization. The above AS resin has a reduced viscosity of 0.2 to 1.0 dl/g, preferably 0.3 to 0.5 dl/g. The reduced viscosity is a value obtained by exactly weighing 0.25 g of an AS resin, dissolving the AS resin in 50 ml of dimethylformamide over 2 hours and measuring the solution at 30° C. with a Ubbellohde's viscometer. A viscometer having a dropping time period of 20 to 100 seconds is used. The reduced viscosity is determined on the basis of the following equation using a time period ($t_0$) that dropping of the solvent takes by the second and a time period (t) that dropping of the solution takes by the second.

Reduced viscosity $(\eta_{SP}/C) = \{(t/t_0)-1\}/0.5$

When the AS resin as a virgin resin is incorporated into a resin composition to be regenerated, it is preferred to use an AS resin that has, per 100% by weight of the entire AS resin, an acrylonitrile content of 15 to 35% by weight and a styrene content of 85 to 65% by weight, is produced by bulk polymerization and has a reduced viscosity of 0.3 to 0.5 dl/g.

The ABS resin refers to a mixture containing a thermoplastic graft copolymer obtained by graft polymerization of a vinyl cyanide compound and an aromatic vinyl compound with a diene-based rubber component and a copolymer from a vinyl cyanide compound and an aromatic vinyl compound. The diene-based rubber component for forming the above ABS resin is selected from rubbers having a glass transition temperature of −10° C. or lower, such as polybutadiene, polyisoprene and a styrene-butadiene copolymer. The content thereof per 100% by weight of the ABS resin components is preferably 5 to 80% by weight, more preferably 8 to 50% by weight, particularly preferably 10 to 30% by weight.

As a vinyl cyanide compound to be grafted on the diene-based rubber component, acrylonitrile is particularly preferred. While the aromatic vinyl compound to be grafted on the diene-based rubber component is similarly selected from those described above, styrene and α-methylstyrene are particularly preferred. The content of the above component to be grafted on the diene-based rubber component, per 100% by weight of the ABS resin components, is preferably 95 to 20% by weight, particularly preferably 50 to 90% by weight. Further, per 100% by weight of the total amount of the vinyl cyanide compound and the aromatic vinyl compound, preferably, the content of the vinyl cyanide compound is 5 to 50% by weight, and the content of the aromatic vinyl compound is 95 to 50% by weight. As part of the above component to be grafted on the diene-based rubber component, methyl (meth)acrylate, ethyl acrylate, maleic acid anhydride, N-substituted maleimide or the like may be used. The content thereof based on the ABS resin components is preferably 15% by weight or less. A variety of known initiators, chain transfer agents, emulsifier, etc., may be used as required for the reaction.

In the above ABS resin, the diameter of rubber particles is preferably 0.1 to 5.0 μm, more preferably 0.2 to 3.0 μm, particularly preferably 0.3 to 1.5 μm. Rubber particles having a single particle distribution can be used, and rubber particles having a particle distribution with two or more peaks can be also used. In morphology, further, the rubber particles may have a single phase, and the rubber particles may have a salami structure in which an occluded phase is contained around each rubber particle.

Further, it is well known that an ABS resin contains a vinyl cyanide compound and an aromatic vinyl compound that are not grafted on a diene-based rubber component, and the ABS resin may contain such free polymer components that occur during polymerization. The such free copolymer comprising a vinyl cyanide compound and aromatic vinyl compound has a reduced viscosity, as a reduced viscosity (30° C.) measured by the above-described method, of 0.2 to 1.0 dl/g, more preferably 0.3 to 0.7 dl/g.

The content of the vinyl cyanide compound and the aromatic vinyl compound that are grafted, based on the diene-based rubber component, is preferably 20 to 200%, more preferably 20 to 70% when expressed as a graft ratio (weight %).

While the above ABS resin may be produced by any one of bulk polymerization, suspension polymerization and emulsion polymerization methods, an ABS resin produced by bulk polymerization is particularly preferred. Further, the copolymerization may be carried out at one step or at multi-steps. Further, there may be used a blend of the ABS resin obtained by the above method and a vinyl compound polymer obtained by separate polymerization of an aromatic vinyl compound and a vinyl cyanide component.

When the ABS resin as a virgin resin is incorporated into a resin composition to be regenerated, it is preferred to use an ABS resin that has a diene-based-rubber-component content, per 100% by weight of the entire ABS resin, of 10 to 30% by weight, has, per 100% by weight of components other than the diene-based rubber component, an acrylonitrile content of 15 to 35% by weight and a styrene content of 85 to 65% by weight, is produced by bulk polymerization and has a reduced viscosity of 0.3 to 0.7 dl/g.

In the present invention, the flame retardant (Component A-3 or C-3) includes phosphoric ester, alkali (alkaline earth) metal salt of an inorganic acid, alkali (alkaline earth) metal salt of an organic acid, an organohalogen compound, red phosphorus, an organosiloxane compound, an inorganic phosphoric acid salt and a hydrate of an inorganic metal compound. Of these, phosphoric ester, alkali (alkaline earth) metal salt or an organosiloxane compound is preferred.

The phosphoric ester includes one or at least two phosphoric esters of the following general formula (4).

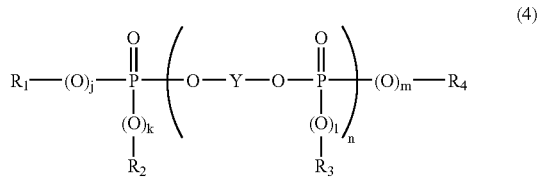

(4)

wherein Y is a divalent group derived from hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone or bis(4-hydroxyphenyl)sulfide, each of j, k, l and m is independently 0 or 1, n is an integer of 0 to 5, provided that n is an average of 0 to 5 in the case of a mixture of n different phosphoric esters, and each of $R^1$, $R^2$, $R^3$ and $R^4$ is independently a monovalent group derived from phenol, cresol, xylenol, isopropylphenol, butylphenol or p-cumylphenol on which at least one halogen atom is optionally substituted.

Of these, preferably, in the above formula, Y is a group derived from hydroquinone, resorcinol or bisphenol A, each of j, k, l and m is 1, n is an integer of 0 to 3, provided that n is an average of 0 to 3 in the case of a mixture of n different phosphoric esters, and each of $R^1$, $R^2$, $R^3$ and $R^4$ is independently a group derived from phenol, cresol or xylenol on which at least one halogen atom is optionally substituted.

Further, particularly preferably, Y is a group derived from resorcinol or bisphenol A, each of j, k, l and m is 1, n is 0 or 1, and each of $R^1$, $R^2$, $R^3$ and $R^4$ is independently a group derived from phenol or xylenol. Of these organic phosphoric ester flame retardants, triphenyl phosphate as a monophosphate compound and resorcinol bis(dixylenylphosphate) and bisphenol A bis(diphenylphosphate) as a phosphoric acid oligomer are excellent in flame retardancy and flowability during molding and they are excellent in hydrolyzability and undergoes little or no decomposition for a long period of time. For these reasons, they are particularly preferably used as a virgin material that is to be incorporated into a molded article pulverized material as Component A.

In the alkaline (alkaline earth) metal salt of an inorganic acid as a flame retardant, the alkali metal includes lithium, sodium, potassium and cesium, and the alkaline earth metal includes calcium, magnesium and barium. The inorganic acid includes $H_3AlF_6$, $H_3BF_6$, $H_3SbF_6$, $H_2TiF_6$, $H_2SiF_6$, $H_3PO$, $H_2ZrF_6$, $H_2WF_6$ and $HBF_4$. As an inorganic alkali metal salt or inorganic alkaline earth metal salt, $Na_3AlF_6$ and $Ca_3(AlF_6)_2$ are preferred.

In the alkaline (alkaline earth) metal salt of an organic acid as a flame retardant, the alkali metal includes lithium, sodium, potassium and cesium, and the alkaline earth metal includes calcium, magnesium and barium.

The organic acid includes aliphatic sulfonic acids, aliphatic sulfonic esters, aromatic sulfonic acids, aromatic sulfone amides, aromatic carboxylic acids and aliphatic carboxylic acids. Specific examples thereof include methylsulfonic acid, laurylsulfuric ester, hexadecylsulfuric ester, polyoxyethylene alkyl ether sulfuric ester, polyoxyethylene alkylphenyl ether sulfuric ester, mono- or disulfuric esters of ethylene glycol, propylene glycol and butanediol, mono-, di-, tri- or tetrasulfuric ester of pentaerythritol, stearic acid monoglyceride monosulfuric ester, 1,3-bis(2-ethylhexyl) glycerin ether monosulfuric ester, trifluoromethanesulfonic acid, perfluoroethanesulfonic acid, perfluoropropanesulfonic acid, perfluorobutanesulfonic acid, perfluromethylbutanesulfonic acid, perfluorohexanesulfonic acid, perfluoroheptanesulfonic acid, perfluorooctanesulfonic acid, dodecansulfonic acid, benzenesulfonic acid, 2,5-dichlorobenzenesulfonic acid, 2,4,6-trichlorobenzenesulfonic acid, 2,4,5-trichlorobenzenesulfonic acid, diphenylsulfone-3-sulfonic acid, diphenylsulfone-3,3'-disulfonic acid, naphthalenetrisulfonic acid, β-naphthalenesulfonic acid-formalin condensate, N-(p-tolylsulfonyl)-p-toluenesulfoimide, N-(N'-benzylaminocarbonyl)sulfanylimide, N-(phenylcarboxyl)sulfanilamide, caprylic acid, lauric acid, benzoic acid, naphtholcarboxylic acid and 2,4,6-tribromobenzoic acid. As an organic alkali metal salt or organic alkaline earth metal salt, preferred are potassium perfluorobutansulfonate, calcium perfluorobutanesulfonate, cesium perfluorobutanesulfonate, potassium diphenylsulfone-3-sulfonate, potassium diphenylsulfone-3,3'-disulfonate, a sodium β-naphthalenesulfonate-formalin condensate and potassium N-(p-tolylsulfonyl)-p-toluenesulfoimide Examples of the organohalogen compound as a flame retardant include carbonate oligomer of tetrabromobisphenol A (TBA), decabromodiphenyl ether, octabromodiphenyl ether, tetrabromodiphenyl ether, hexabromocyclodecane, ethylenebistetrabromophthalimide, tris(pentabromobenzyl) isocyanurate, brominated polystyrene, a TBA epoxy resin and a TBA epoxy resin terminated with tetrabromophenol.

Of these, a carbonate oligomer of tetrabromobisphenol A has excellent flame retardancy, generates little or no harmful substance, has excellent compatibility with an aromatic polycarbonate resin, attains excellent flame retardancy without decreasing the mechanical properties typified by impact resistance and causes little or no decrease in mechanical properties for a long period of time. For these reasons, it is particularly preferred as an organohalogen compound that is to be incorporated, as a virgin material, into Component A.

The red phosphorus as a flame retardant not only includes general red phosphorus but also includes red phosphorus that is surface-microcupsulated with a thermosetting resin and/or an inorganic material. Further, when red phosphorus as a virgin material is incorporated into Component A, it is preferred to use red phosphorus in the form master pellet for lighter safty and workability. The red phosphorus has an average particle diameter of 1 to 100 μm, preferably 1 to 40 μm. Commercially available products that are microcapsulated red phosphorus include Novaexcel 140, Novaexcel F-5 (trade name, supplied by Rinkagaku Kogyo Co., Ltd.), Hishiguard TP-10 (trade name: Nippon Chemical Industrial Co., Ltd.) and Hostaflam RP614 (trade name: Clariant Japan K.K.).

The organosiloxane compound as a flame retardant includes compounds having a basic structure of the following general formula (5).

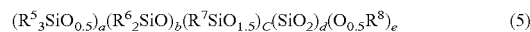

(5)

In the general formula (5), each of $R^5$, $R^6$ and $R^7$ is a hydrocarbon group having 1 to 12 carbon atoms, such as an alkyl group having 1 to 12 carbon atoms, an alkenyl group having 2 to 12 carbon atoms, an aryl group having 6 to 12 carbon atoms and an arylalkyl group having 7 to 12 carbon atoms. The substituents for $R^5$ and $R^6$ may be the same as, or different from, each other. $R^8$ is an alkyl group having 1 to 4 carbon atoms.

Specific examples of the above alkyl group include methyl, ethyl, n-propyl, isopropyl, various butyls, various hexyls and cyclohexyl. Specific examples of the alkenyl group include vinyl, allyl and cyclohexenyl. Specific examples of the aryl group include phenyl, naphthyl and tolyl. Specific examples of the arylalkyl group include benzyl, β-phenetyl and 2-phenylpropyl. Of these, phenyl, vinyl and methyl cause to the organosiloxane compound to exhibit more effective flame retardancy, and such an organosiloxane compound can be used preferably, and an organosiloxane compound containing phenyls is particularly preferred. The content of such phenyl based on organic groups ($R^5$, $R^6$, $R^7$ and $R^8$) in the organosiloxane is at least 15 mol %, preferably at least 20 mol %, more preferably 25 to 90 mol %, particularly preferably 25 to 70 mol %.

Further, there can be also used a compound obtained by providing the organosiloxane compound of the above formula in which one of $R^5$, $R^6$ and $R^7$ is a phenolic-hydroxy-group-containing monovalent organic group and copolymerizing such an organosiloxane compound together with a polycarbonate resin. Examples of the phenolic-hydroxy-group-containing monovalent organic group include 2-(o-hydroxyphenyl)ethyl, 2-(p-hydroxyphenyl)ethyl, 2-(m-hydroxyphenyl)ethyl, 1-(o-hydroxyphenyl)ethyl, 1-(p-hydroxyphenyl)ethyl, 1-(m-hydroxyphenyl)ethyl, 3-(o-hydroxyphenyl)propyl, 3-(p-hydroxyphenyl)propyl, 3-(m-hydroxyphenyl)propyl, 2-(o-hydroxyphenyl)propyl, 2-(p-hydroxyphenyl)propyl and 2-(m-hydroxyphenyl)propyl.

In the general formula (5), a, b, c and d satisfy the relationship of $0 \leq a \leq 0.75$, $0 \leq b \leq 1$, $0 \leq c \leq 0.5$, $0 \leq d \leq 0.25$ and (a+b+c+d)=1. While (a+b+c+d)=1, e satisfies $0 \leq e \leq 0.7$. Further, c and d can be zero together in no case. Further, preferably, $0.5 \leq b \leq 0.9$, $0.1 \leq c \leq 0.5$ and (b+c) is 0.7 or greater. Preferably, further, while (a+b+c+d)=1, $0.1 \leq e \leq 0.5$ Further, the above organosiloxane compound preferably has a kinematic viscosity, at 25° C., of 1 to 10,000 cSt (centistokes), more preferably 5 to 1,000 cSt, still more preferably 5 to 300 cSt, particularly preferably 5 to 100 cSt.

Further, an inorganic phosphoric acid salt such as polyphosphoric acid ammonium salt can be used as a flame retardant, and further, the flame retardant can be also selected, for example, from inorganic metal hydroxides such as aluminum hydroxide, magnesium hydroxide, dolomite, hydrotalcite, calcium hydroxide, barium hydroxide, basic magnesium carbonate, zirconium hydroxide and hydrate of tin oxide.

The impact modifier (Component A-4 or C-4) refers to a rubber polymer having a glass transition temperature of 10° C. or lower, preferably −10° C. or lower, more preferably −30° C. or lower, or a rubber-polymer-component-containing polymer that is formed by copolymerization of the above rubber polymer and a component copolymerizable therewith and has a rubber polymer component content of at least 40% by weight. The rubber polymer includes polybutadiene, polyisoprene, diene-based copolymers (e.g., styrene-butadiene random and block copolymers, an acrylonitrile-butadiene copolymer and acryl-butadiene rubbers (a copolymer of alkyl acrylate or alkyl methacrylate and butadiene)), ethylene-α-olefin copolymers (e.g., ethylene-propylene random and block copolymers, and ethylene-butene random and block copolymers), ethylene-unsaturated carboxylic ester copolymers (e.g., an ethylene-methacrylate copolymer, an ethylene-ethyl acrylate copolymer and an ethylene-butyl acrylate copolymer), ethylene-aliphatic vinyl copolymers (e.g., ethylene-vinyl acetate copolymer), ethylene-propylene non-conjugated diene polymers (e.g., an ethylene-propylene-hexadiene copolymer), acryl rubbers (e.g., polybutyl acrylate, poly(2-ethylhexyl acrylate) and a butyl acrylate-2-ethylhexyl acrylate copolymer), and silicone-based rubbers (e.g., a polyorganosiloxane rubber, an IPN type rubber formed of a polyorganosiloxane rubber component and an acryl rubber component; i.e., a rubber having a structure in which two rubber components are intricately entangled with each other, and an IPN type rubber formed of a polyorganosiloxane rubber component and a polyisobutylene rubber component). As a polyorganosiloxane rubber, a polydimethylsiloxane polymer is preferred.

The monomer component that is used for copolymerization with the above rubber component includes an aromatic vinyl compound, a vinyl cyanide compound, a (meth)acrylic ester compound and a (meth)acrylic acid compound. As other monomer component, the above component includes epoxy-group-containing methacrylic esters such as glycidyl methacrylate, maleimide monomers such as maleimide, N-methylmaleimide and N-phenylmaleimide, and α,β-unsaturated carboxylic acids and anhydrides thereof, such as acrylic acid, methacrylic acid, maleic acid, maleic anhydride, phthalic acid and itaconic acid.

More specifically, the impact modifier includes an SB (styrene-butadiene) polymer, an ABS (acrylonitrile-butadiene-styrene) polymer, an MBS (methyl methacrylate-butadiene-styrene) polymer, an MABS (methyl methacrylate-acrylonitrile-butadiene-styrene) polymer, an MB (methyl methacrylate-butadiene) polymer, an ASA (acrylonitrile-styrene-acryl rubber) polymer, an AES (acrylonitrile-ethylenepropylene rubber-styrene) polymer, an MA (methyl methacrylate-acryl rubber) polymer, an MAS (methyl methacrylate-acryl rubber-styrene) polymer, a methyl methacrylate-acryl•butadiene rubber copolymer, a methyl methacrylate-acryl•butadiene rubber-styrene copolymer and a methyl methacrylate-(acryl-silicone IPN rubber) polymer.

As other elastic polymer, the impact modifier includes various thermoplastic elastomers such as a styrene-based thermoplastic elastomer, an olefin-based thermoplastic elastomer, a polyurethane-based thermoplastic elastomer, a polyester-based thermoplastic elastomer and a polyamide-based thermoplastic elastomer.

The resin composition in the present invention may contain a dripping preventing agent for improving flame retardancy, and the dripping preventing agent includes a fluorine-containing polymer having fibril formability. The above polymer includes polytetrafluoroethylene, a tetrafluoroethylene-based polymer (e.g., a tetrafluoroethylene/hexafluoropropylene copolymer), a partially fluorinated polymer disclosed in U.S. Pat. No. 4,379,910 and a polycarbonate resin produced from fluorinated diphenol, while polytetrafluoroethylene is preferred.

Polytetrafluoroethylene having fibril formability is classified into the type 3 in ASTM Standard. Further, the above polytetrafluoroethylene having fibril formability preferably has a primary particle diameter in the range of from 0.05 to 10 μm and preferably has a secondary particle diameter of 50 to 700 μm. The above polytetrafluoroethylene has the capability of preventing dripping of a melt in a combustion test of a test piece in a vertical combustion test according to UL standard, and such polytetrafluoroethylenes having fibril formability are commercially and easily available in the trade name of Teflon 6J from DuPont-Mitsui Fluorochemicals Company, Ltd. or in the trade name of Polyfureon from Daikin Industries, Ltd.

When the above polytetrafluoroethylene (to be sometimes referred to as "PTFE" hereinafter) as a virgin material is used, not only a polytetrafluoroethylene that is generally in the form of a solid can be used, but also a product in the form of an aqueous dispersion can be used. Further, for improving dispersibility in a resin and, further, for attaining excellent flame retardancy and mechanical properties, PTFE mixtures having the following forms can be used as a PTFE having fibril formability.

As a first one, there is a co-aggregate mixture of a PTFE dispersion and a vinyl polymer. Specifically, JP-A-60-258263 describes a method in which a dispersion of PTFE having an average particle diameter of 0.05 to 5 μm and a dispersion of a vinyl polymer are mixed, and coagulated without a size of greater than 30 μm of PTFE particles and such a coagulation product is dried to obtain a PTFE mixture, and such a mixture can be used.

As a second one, there is a mixture of a PTFE dispersion and dry polymer particles. The polymer particles can be selected from various types, and the polymer particles are preferably particles of a polycarbonate resin powder or an ABS resin powder. Concerning the above mixture, JP-A-4-272957 describes a mixture of a PTFE dispersion and an ABS resin power, and such a method can be used.

As a third one, there is a PTFE mixture obtained by providing a mixture of a PTFE dispersion and a thermoplastic resin solution and simultaneously removing a medium of each. As a specific example, there is a mixture obtained by removing the media with a spray dryer, and JP-A-08-188653 describes such a mixture.

As a fourth one, there is a PTFE mixture obtained by polymerizing other vinyl monomer in a PTFE dispersion. Concerning such a mixture, JP-A-9-95583 specifically describes a method in which styrene and acrylonitrile are fed into a PTFE latex, to obtain a PTFE mixture, and such a mixture can be used.

As a fifth one, there is a method in which a PTFE dispersion and a dispersion of polymer particles are mixed and then a vinyl monomer is polymerized in the mixture of the dispersion. Thus-prepared PTFE mixture is preferred in that simple production and formation of a fine PTFE dispersion can be compatibilized. JP-A-11-29679 describes details of such a mixture. That is, in a dispersion of a mixture of a PTFE dispersion having a particle diameter of 0.05 to 1.0 μm and a dispersion of polymer particles, a monomer having an ethylenically unsaturated bond is emulsion-polymerized, and then the resultant mixture is coagulated or spray-dried to obtain a powder of a PTFE mixture, which is preferred.

The above "polymer particles" include polypropylene, polyethylene, polystyrene, HIPS, an AS resin, an ABS resin, an MBS resin, an MABS resin, an ASA resin, polyalkyl (meth)acrylate, a block copolymer formed from styrene and butadiene and a hydrogenated copolymer thereof, a block copolymer obtained from styrene and isoprene and a hydrogenated copolymer thereof, an acrylonitrile-butadiene copolymer, ethylene-propylene random and block copolymers, ethylene-butene random and block copolymers, an ethylene-α-olefin copolymer, an ethylene-unasaturated carboxylic ester copolymer such as ethylene-butyl acrylate, an acrylate-butadiene copolymer, a composite rubber containing polyorganosiloxane and polyalkyl (meth)acrylate and a copolymer obtained by grafting a vinyl monomer such as styrene, acrylonitrile or polyalkyl methacrylate to such a composite rubber. Of these, polyalkyl (meth)acrylate, polystyrene, an AS resin, an ABS resin and an ASA resin are preferred.

The monomer having an ethylenically unsaturated bond can be selected from styrene-containing monomers such as styrene, p-methylstyrene, o-methylstyrene, p-methoxystyrene, o-methoxystyrene, 2,4-dimethystyrene and α-methylstyrene; acrylate monomers such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, cyclohexyl acrylate and cyclohexyl methacrylate; vinyl cyanide monomers such as acrylonitrile and methacrylonitrile; vinyl ether monomers such as vinyl methyl ether and vinyl ethyl ether; vinyl carboxylate monomers such as vinyl acetate and vinyl butyrate; olefin monomers such as ethylene, propylene and isobutylene; and diene monomers such as butadiene, isoprene and dimethylbutadiene. These monomers may be used alone or in combination.

As a PTFE mixture having the above fourth form, "Blendex 449" (trade name) is available from GE Speciality Chemicals, and as a PTFE mixture having the above fifth form, "Metablen A3000" (trade name) is available from Mitsubishi Rayon Co., Ltd. These are easily available and preferred in the present invention.

When the dripping preventing agent as a virgin material is incorporated, the amount thereof per 100% by weight of the regenerated resin composition of the present invention is preferably 0.05 to 1% by weight. When Component A contains the above dripping preventing agent, the intended dripping prevention is liable to be insufficient when the amount is less than 0.05% by weight, and the amount of 1% by weight as an upper limit is sufficient for the object thereof.

The reinforcing filler (Component A-5 or C-5) includes talc, mica, clay, wollastonite, montmorillonite, smectite, kaolin, calcium carbonate, a glass fiber, glass beads, glass balloon, a milled fiber, glass flakes, a carbon fiber, carbon flakes, carbon beads, a carbon milled fiber, metal flakes, a metal fiber, a metal-coated glass fiber, a metal-coated carbon fiber, metal-coated glass flakes, silica, ceramic particles, a ceramic fiber, ceramic balloon, aramid particles, an aramid fiber, a polyarylate fiber, graphite, an electrically conductive carbon black, carbon black, potassium titanate whisker, aluminum borate whisker and various whiskers of basic magnesium sulfate, and the like. The reinforcing filler may be of one type or a mixture of at least two types of these.

Particularly preferred is a case where the reinforcing filler is talc or wollastonite that is destroyed in almost no case in the step of pulverization and/or a kneading step to produce a regenerated resin composition and which is a high-safety and fine filler, or it is particularly talc. When the reinforcing filler as a virgin material is incorporated, talc is preferred, and talc having higher purity is more preferred.

The resin composition of the present invention may further contain various stabilizers, and when various virgin materials are incorporated to produce the resin composition, it is preferred to incorporate various heat stabilizers and antioxidants.

The above heat stabilizers include phosphorus-containing stabilizers, and as a phosphorus-containing stabilizer, any one of phosphite, phosphonite and phosphate stabilizers can be used.

The phosphate stabilizer refers, for example, to a phosphate compound of the general formula (6).

(6)

wherein $R^8$ is a hydrogen atom or is an alkyl group having 1 to 20 carbon atoms, an aryl or alkaryl group having 6 to 20 carbon atoms, an aralkyl group having 7 to 30 carbon atoms, or a substituent formed by substituting a halo-, alkylthio (in which the alkyl has 1 to 30 carbon atoms) or hydroxy substituent on any one of these, provided that three substitutents as $R^8$ are the same or different and substituents as $R^8$ may have cyclic structures derived from dihydric phenols.

Further, as a more preferred embodiment, the compound of the general formula (6) includes a phosphate compound of the following general formula (7),

wherein each of $R^9$ and $R^{10}$ is a hydrogen atom, an alkyl group having 1 to 20 carbon atoms, an aryl or alkylaryl group having 6 to 20 carbon atoms, or an aralkyl group having 7 to 30 carbon atoms, provided that $R^9$ and $R^{10}$ are hydrogen atoms together in no case and that may be the same as, or different from, each other.

Further, the phosphite stabilizer includes a phosphate compound of the following general formula (8),

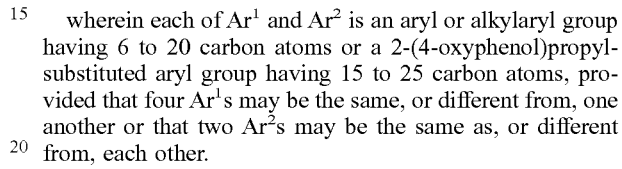

wherein each of $R^{11}$ and $R^{12}$ is a hydrogen atom, an alkyl group having 1 to 20 carbon atoms, an aryl or alkylaryl group having 6 to 20 carbon atoms, an aralkyl group having 7 to 30 carbon atoms, a cycloalkyl group having 4 to 20 carbon atoms or a 2-(4-oxyphenyl)propyl-substituted aryl group having 15 to 25 carbon atoms, provided that $R^{11}$ and $R^{12}$ may be the same as, or different from, each other and that Further, the cycloalkyl group and the aryl group may be substituted with an alkyl group or may not be substituted with an alkyl group.

Further, the phosphate stabilizer includes a phosphate compound of the following general formula (9), (9)

$R^{13}O$—P—O—⬡—C(CH₃)(CH₃)—⬡—O—P—$OR^{13}$, $R^{14}O$, $OR^{14}$ wherein each of $R^{13}$ and $R^{14}$ is an alkyl group having 12 to 15 carbon atoms, provided that $R^{13}$ and $R^{14}$ may be the same as, or different from, each other.

The phosphonite stabilizer includes a phosphonite compound of the following general formula (10) and a phosphonite compound of the following general formula (11).

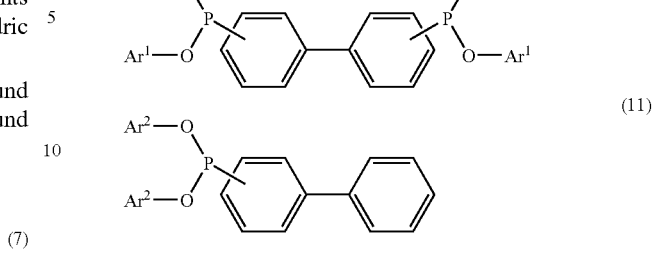

wherein each of $Ar^1$ and $Ar^2$ is an aryl or alkylaryl group having 6 to 20 carbon atoms or a 2-(4-oxyphenol)propyl-substituted aryl group having 15 to 25 carbon atoms, provided that four $Ar^1$s may be the same, or different from, one another or that two $Ar^2$s may be the same as, or different from, each other.

Of the above phosphate compounds and phosphonite compounds, more preferred as phosphorus-containing stabilizer are the phosphite compound of the above general formula (7) and the phosphonite compounds of the above general formulae (10) and (11). These compounds may be used alone or in combination, and it is preferred to employ an embodiment in which the phosphate compound of the above general formula (7) is contained in an amount of at least 5% by weight per 100% by weight of Component E.

Preferred specific examples of the phosphite compound of the above general formula (6) include diphenylisooctyl phosphite, 2,2'-methylenebis(4,6-di-tert-butylphenyl)octyl phosphite, diphenylmono(tridecyl) phosphite, phenyldiisodecyl phosphite and phenyldi(tridecyl) phosphite. More preferred specific examples of the compound of the above general formula (7) include triphenyl phosphite, tris(dimethylphenyl) phosphite, tris(diethylphenyl) phosphite, tris (di-iso-propylphenyl) phosphite, tris(di-n-butylphenyl) phosphite, tris(2,4-di-tert-butylphenyl) phosphite and tris(2, 6-di-tert-butylphenyl) phosphite. Tris(dialkyl-substituted phenyl) phosphite is preferred, tris(di-tert-butylphenyl) phosphite is more preferred, and tris(2,4-di-tert-butylphenyl) phosphite is particularly preferred. The above phosphite compounds may be used alone or in combination.

Preferred specific examples of the phosphite compound of the above general formula (8) include distearylpentaerythritol diphosphite, bis(2,4-di-tert-butylphenyl)pentaerythritol diphosphite, bis(2,6-di-tert-butyl-4-methylphenyl)pentaerythritol diphosphite, phenyl bisphenol A pentaerythritol diphosphite and dicyclohexylpentaerythritol diphosphite. Preferred are distearylpentaerythritol diphosphite, bis(2,4-di-tert-butylphenyl)pentaerythritol diphosphite and bis(2,6-di-tert-butyl-4-methylphenyl)pentaerythritol diphosphite. These phosphite compounds may be used alone or in combination.

The phosphite compound of the above general formula (9) is specifically preferably 4,4'-isopropylidenediphenoltridecyl phosphite.

Preferred specific examples of the phosphonite compound of the above general formula (10) include tetrakis(2,4-diisopropylphenyl)-4,4'-biphenylene diphosphonite, tetrakis (2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-isopropylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite. Tetrakis(di-tert-butylphenyl)-biphenylene diphosphonite is preferred, and tetrakis(2,4-di-tert-butylphenyl)-biphenylene diphosphonite is more preferred. The above tetrakis(2,4-di-tert-butylphenyl)-biphenylene diphosphonite is preferably a mixture of two or more compounds. Specifically, tetrakis(2,4-di-tert-butylphenyl)-4,4'-biphenylene diphosphonite (Compnent x1), tetrakis(2,4-di-tert-butylphenyl)-4,3'-biphenylene diphosphonite (Component x2) and tetrakis(2,4-di-tert-butylphenyl)-3,3'-biphenylene diphosphonite (Component x3) may be used alone or in combination, and it is preferred to use a mixture of these three compounds. In the mixture of the three compounds, the Component x1/Component x2/Component x3 weight ratio is preferably in the range of 100:37–64:4–14, more preferably in the range of 100:40–60:5–11.

Preferred specific examples of the phosphonite compound of the above general formula (11) include bis(2,4-di-isopropylphenyl)-4-phenyl-phenyl phosphonite, bis(2,4-di-n-butylphenyl)-3-phenyl-phenyl phosphonite, bis(2,4-di-tert-butylphenyl)-4-phenyl-phenyl phosphonite, bis(2,4-di-tert-butylphenyl)-3-phenyl-phenyl phosphonite, bis(2,6-di-isopropylphenyl)-4-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite. Preferred is bis(di-tert-butylphenyl)-phenyl-phenyl phosphonite, and bis(2,4-di-tert-butylphenyl)-phenyl-phenyl phosphonite is more preferred. The above bis(2,4-di-tert-butylphenyl)-phenyl-phenyl phosphonite is preferably a mixture of two or more compounds. Specifically, bis(2,4-di-tert-butylphenyl)-4-phenyl-phenyl phosphonite and bis(2,4-di-tert-butylphenyl)-3-phenyl-phenyl phosphonite may be used alone or in combination, and a mixture of these compounds is preferred. In the mixture of the above compounds, the amount ratio thereof by weight is preferably in the range of 5:1–4, more preferably in the range of 5:2–3.

The phosphate stabilizer includes tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Trimethyl phosphate is preferred.

The above phosphorus-containing heat stabilizers may be used alone or in combination. The content of the phosphorus-containing stabilizer per 100% by weight of the regenerated resin composition of the present invention is in the range of from 0.001 to 0.5% by weight, more preferably 0.005 to 0.3% by weight.

For producing the regenerated resin composition, various antioxidants as a virgin material may be incorporated as required for producing a regenerated resin composition having excellent mechanical properties, and the like. Examples of the above antioxidant include vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzyl phosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl) propionate, 1,6-hexanediolbis[3-(3,5-di-tert-butyl-4-hydroxyphenyl) propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl) sulfide, 4,4'-di-thiobis(2,6-di-tert-butylphenol), 4,4'-tri-thiobis(2,6-di-tert-butylphenol), 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl- 2,4,6-tris(3,5-di-tert-butyl-4-hydroxybenzyl)benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris2[3(3,5-di-tert-butyl-4-hydroxyphenyl)propionyloxy]ethyl isocyanurate, and tetrakis[methylene-3-(3',5'-di-tert-butyl-4-hydroxyphenyl) propionate]methane. The content of the antioxidant per 100% by weight of the regenerated resin composition is preferably in the range of from 0.0001 to 0.5% by weight, more preferably 0.001 to 0.3% by weight.

For producing the regenerated resin composition, various ultraviolet absorbents as a virgin material may be incorporated. Examples of the ultraviolet absorbent include benzophenone ultraviolet absorbents typified by 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2'-dihydroxy-4-methoxybenzophenone, 2-hydroxy-4-methoxy-2'-carboxybenzophenone, 2-hydroxy-4-methoxy-5-sulfoxybenzophenone, 2,2'-dihydroxy-4,4'-dimethoxybenzophenone, 2,2',4,4'-tetrahydroxybenzophenone, 2,2'-dihydroxy-4,4'-dimethoxy-5-sodiumsulfoxybenzophenone and bis(5-benzoyl-4-hydroxy-2-methoxyphenyl)methane.

Further, examples of the ultraviolet absorbent include benzotriazole ultraviolet absorbents typified by 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-( 2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl)phenylbenzotriazole, 2-[2'-hydroxy-3'-(3",4",5",6"-tetraphthalimidomethyl)-5'-methylphenyl]benzotriazole, 2-(2'-hydroxy-3'-tert-butyl-5'-metehylphenyl)-5-chlorobenzotriazole, 2-(2'-hydroxy-3',5'-di-tert-butylphenyl)-5-chlorobenzotriazole, 2,2'-metyhylenebis[4-(1,1,3,3-tetramethylbutyl)-6-(2H-benzotriazol-2-yl)phenol] and an adduct of methyl-3-[3-tert-butyl-5-(2H-benzotriazol-2-yl)-4-hydroxyphenylpropionate with polyethylene glycol.

Further, the regenerated resin composition may contain hindered amine light stabilizers typified by bis(2,2,6,6-tetramethyl-4-piperizyl)sebacate, bis(1,2,2,6,6-pentamethyl-4-piperizyl)sebacate, bis(1,2,2,6,6-pentamethyl-4-piperizyl)-2-(3,5-di-tert-butyl-4-hydroxybenzyl)-2n-butylmalonate, a condensate of 1,2,3,4-butanecarboxylic acid, 2,2,6,6-tetramethyl-4-piperizinol and tridecyl alcohol, a condensate of 1,2,3,4-butanedicarboxylic acid, 1,2,2,6,6-pentamethyl-4-piperizinol and tridecyl alcohol, tetrakis(2,2,6,6-tetramethyl-4-piperizyl)-1,2,3,4-butanetetracarboxylate, tetrakis(1,2,2,6,6-pentamethyl-4-piperizyl)-1,2,3,4-butane-tetradarboxylate, poly{[6-(1,1,3,3-tetramethyl)amino-1,3,5-triazine-2,4-diyl][(2,2,6,6-tetramethylpiperizyl)imino]hexamethylene[(2,2,6,6-tetramethylpiperizyl)imino]}, poly{[6-morpholino-s-triazine-2,4-diyl][(2,2,6,6-tetramethylpiperizyl)imino]hexamethylene[(2,2,6,6-tetramethylpiperizyl)imino]}, a condensate of 1,2,3,4-butanetetracarboxylic acid, 2,2,6,6-tetramethyl-4-piperizinol and β,β,β',β'-tetramethyl-3,9-(2,4,8,10-tetraoxaspiro[5,5]undecane)diethanol, a condensate of N,N'-bis(3-aminopropyl)ethylenediamine and 2,4-bis[N-butyl-N-(1,2,2,6,6-pentamethyl-4-piperizyl)amino]-chloro-1,3,5-triazine, a condensate of 1,2,3,4-butanetetracarboxylic acid, 1,2,2,6,6-pentamethyl-4-piperizinol and β,β,β',β'-tetramethyl-3,9-(2,4,8,10-tetraoxaspiro[5,5]undecane)diethanol, and polymethylpropyl-3-oxy-[4-(2,2,6,6-tetramethyl)piperizinyl]cyclohexane. The above light stabilizers may be used alone or in combination. The content of each of the above ultraviolet absorbent and the above light stabilizer per 100% by weight of the regenerated resin composition is 0.0001 to 1% by weight, preferably 0.001 to 0.5% by weight.

Further, the mold release agent includes an olefin-based wax, silicone oil, organopolysiloxane, a higher fatty acid ester of a monohydric or higher alcohol, paraffin wax and beeswax.

The regenerated resin composition of the present invention can be produced by blending the molded article pulverized material and various virgin materials including the aromatic polycarbonate resin with a mixer such as a V-shaped blender, a Nauta mixer, a Henschel mixer or a Banbury mixer or by melt-kneading them with a heating kneader such as a kneading roll or an extruder. Further, there may be employed a method in which the molded article pulverized material is melt-kneaded to prepare granules in advance and the granules are blended or melt-kneaded with various virgin materials. Further, various virgin materials that are melt-kneaded beforehand may be blended or melt-kneaded with a pulverized material and/or a melt-kneaded material of the pulverized material. The heating temperature for the melt-kneading is generally set in the range of from 220° C. to 340° C.

The thus-obtained regenerated resin composition can be widely used in the fields of electric, electronic, office automation machines and equipment where mechanical strength and long-term mechanical properties are required and recycled products are suitably used, by utilizing injection molding, injection compression molding, extrusion, compression molding, hollow molding, calendaring, blow molding, vacuum forming and rotary molding, or the like, and the regenerated resin composition accomplishes effective recycling.

EXAMPLES

The present invention will be further explained with reference to Examples hereinafter. In Examples, "%" stands for "% by weight", and evaluations were conducted by the following methods.

(1) Evaluation Items (a) Wet heat retention ratio: A pulverized material or a molded article of a regenerated resin composition was treated with a pressure cooker tester (ultra-acceleration life tester (PC-305III/V), supplied by Hirayama Manufacturing Corporation) for 24 hours under conditions of 120° C., 100% RH, 2 atmospheric pressures, and a wet heat retention ratio was determined on the basis of the following equation.

Wet heat retention ratio (%)=viscosity average molecular weight after wet heat treatment/viscosity average molecular weight before wet heat treatment)×100

(b) Initial flexural strength: Measured according to ASTM D790.

(c) Initial impact value: An Izod notched test piece having a thickness of 3.2 mm was measured according to ASTM D256.

(d) Initial flame retardancy: A 1.6 mm thick test piece was subjected to a combustion test according to UL standard 94V.

(e) Long-term accelerated flexural strength: A test piece according to ASTM D790 was treated in a constant-temperature constant-humidity tester (Platinous F supplied by Tabai Espec Corp.) under conditions of 65° C. and 85% RH for 1,000 hours and then measured according to the above measurement standard.

(f) Long-term accelerated impact value: An izod-notched 3.2 mm thick test piece according to ASTM D256 was treated under the same conditions as those in (e) for 1,000 hours, notched with the same apparatus and cutting tool as those used in the (c) initial impact value and measured according to the above measurement standard.

(g) Long-term accelerated flame retardancy: A 1.6 mm thick test piece according to UL standard 94V was treated under the same conditions as those in (e) and subjected to a flamins test according to the above standard.

(h) Impact value retention ratio: Determined on the basis of the following equation. A higher value of the impact value retention ratio means better performances.

Impact value retention ratio (%)=(long-term accelerated impact value/initial impact value)×100

(2) Composition Analysis Method

Pulverized materials of molded articles containing an aromatic polycarbonate resin, collected from markets, were analyzed for compositions by the following method. Tables 8 and 9 shows results of the following composition analysis.

(i) Analysis of Main Resin Components

Main components were analyzed according to an FT-IR method and a DSC method.

(ii) Analysis of Residue by Hydrazine Decomposition

A molded article pulverized material was immersed in hydrazine at 130° C. for 2 hours to mainly decompose a polycarbonate resin, and a total amount of other resin components such as an ABS resin, inorganic components such as a pigment and dripping preventing agents such as PTFE, etc., were calculated.

(iii) Analysis of Ashed Residue Content

A molded article pulverized material was heat-treated in an electric oven at 600° C. for 3 hours, and an ashed residue amount was calculated to study a content of inorganic components such as a pigment.

(iv) Analysis of a Diene-based Rubber Component Amount

When a diene-based rubber component was identified in a molded article pulverized material, an amount thereof was calculated according to an iodine monochloride method.

(v) Identification of Monomers Such as Diene-based Rubber Component, Etc.

A residue remaining after the hydrazine decomposition in the above (ii) was measured by a pyrolysis gas chromatography mass analysis at 590° C., and monomer components derived from an ABS resin, an MBS resin, etc., were identified.

(vi) Observation of Inorganic Components, Etc.

Residues obtained in the above (ii) or (iii) were observed through a microscope to identify approximate substances of inorganic components, etc.

(vii) Identification of Phosphoric Ester and Identification of its Content

When a phosphoric ester component was contained as a flame retardant, its structure and its content were identified by $^1$H-NMR measurement and fluorescence X-ray measurement.

(viii) Measurement of PTFE Amount

Concerning a molded article pulverized material, a content of a dripping preventing agent was determined by an ion chromatography method on the assumption that the entire dripping preventing agent was PTFE (It was confirmed by DSC measurement of a hydrazine decomposition residue that PTFE was contained).

(ix) Analysis for Halogen-containing Compound

A molded article was analyzed for a bromine compound by Beilstein test and fluorescence X-ray measurement.

(x) Measurement of Bromine Compound Amount

A molded article was measured for a bromine amount by a combustion ion choromatography method. An amount of a bromine amount was determined on the basis of the bromine content of a corresponding bromine compound.

(xi) Amount Ratio of Polycarbonate and Polyester $^1$H-NMR measurement was carried out and a ratio thereof was calculated on the basis of a peak intensity area ratio. A comparison was made between a peak derived from a methyl group of a polycarbonate resin and a peak derived from a methylene group of a polyester resin.

Example 1 and Comparative Example 1

A pulverized material model, a polycarbonate resin, a styrene-based resin, a flame retardant, an impact modifier and a dripping preventing agent were mixed to form a composition as shown in Table 1, and the mixture was fed to a 30 mmφ-diameter vented twin-screw extruder (TEX30XSST, supplied by The Japan Steel Works, Ltd.) and melt-extruded at a cylinder temperature of 260° C. to form pellets. The obtained pellets were dried in a hot air circulation dryer at 100° C. for 5 hours and injection-molded with an injection molding machine (SG150U supplied by Sumitomo Heavy Industries, Ltd.) at a cylinder temperature of 260° C. at a mold temperature 60° C. to give test pieces for evaluation. Table 1 shows evaluation results.

Example 2 and Comparative Example 2

A pulverized material model, a polycarbonate resin, and a dripping preventing agent were mixed to form a composition as shown in Table 1, and the mixture was fed to a 30 mmφ-diameter vented twin-screw extruder (TEX30XSST, supplied by The Japan Steel Works, Ltd.) and melt-extruded at a cylinder temperature of 280° C. to form pellets. The obtained pellets were dried in a hot air circulation dryer at 120° C. for 5 hours and injection-molded with an injection molding machine (SG150U supplied by Sumitomo Heavy Industries, Ltd.) at a cylinder temperature of 290° C. at a mold temperature 70° C. to give test pieces for evaluation. Table 1 shows evaluation results.

TABLE 1

|  |  |  | Unit | Ex. 1 | C. Ex. 1 | Ex. 2 | C. Ex. 2 |
|---|---|---|---|---|---|---|---|
| Formulated composition | Pulverized material | MS-1 | % | — | 30 | — | — |
|  |  | MS-2 | % | 30 | — | — | — |
|  |  | MS-3 | % | — | — | — | 50 |
|  |  | MS-4 | % | — | — | 50 | — |
|  | Polycarbonate resin | PC-1 | % | 48.3 | 48.3 | — | — |
|  |  | PC-2 | % | — | — | 49.8 | 49.8 |
|  | Styrene-based resin | ST-1 | % | 11 | 11 | — | — |
|  | Impact modifier | MD-1 | % | 3.5 | 3.5 | — | — |
|  | Flame retardant | FR-4 | % | 7 | 7 | — | — |
|  | Dripping preventing agent | PTFE | % | 0.2 | 0.2 | 0.2 | 0.2 |
| Properties | Initial flexural strength |  | MPa | 92 | 92 | 93 | 93 |
|  | Initial impact value |  | J/m | 432 | 330 | 685 | 218 |
|  | Initial flame retardancy |  | — | V-0 | V-1 | V-0 | V-0 |
|  | Long-term accelerated flexural strength |  | MPa | 90 | 89 | 92 | 91 |
|  | Long-term accelerated impact value |  | J/m | 347 | 43 | 610 | 46 |
|  | Long-term accelerated flame retardancy |  | — | V-0 | not-V | V-0 | V-1 |
|  | Impact value retention ratio |  | % | 80 | 13 | 87 | 21 |

Ex. = Example,
C. Ex. = Comparative Example

Example 3 and Comparative Example 3

A pulverized material model, a polycarbonate resin, a polyester resin, a flame retardant, an impact modifier, a dripping preventing agent and other components were mixed to form a composition as shown in Table 2, and the mixture was fed to a 30 mmφ-diameter vented twin-screw extruder (TEX30XSST, supplied by The Japan Steel Works, Ltd.) and melt-extruded at a cylinder temperature of 280° C. to form pellets. The obtained pellets were dried in a hot air circulation dryer at 105° C. for 5 hours and injection-molded with an injection molding machine (SG150U supplied by Sumitomo Heavy Industries, Ltd.) at a cylinder temperature of 270° C. at a mold temperature 70° C. to give test pieces for evaluation. Table 2 shows evaluation results.

TABLE 2

|  | Component |  | Unit | Ex. 3 | C. Ex. 3 |
|---|---|---|---|---|---|
| Formulated Composition | Pulverized material | MS-5 | % | — | 30 |
|  |  | MS-6 | % | 30 | — |
|  | Polycarbonate resin | PC-1 | % | 43.8 | 43.8 |
|  | Polyester resin | PET | % | 11.7 | 11.7 |
|  |  | PBT | % | 0.7 | 0.7 |

TABLE 2-continued

|  | Component |  | Unit | Ex. 3 | C. Ex. 3 |
|---|---|---|---|---|---|
|  | Impact modifier | SIS | % | 3 | 3 |
|  | Flame retardant | FR-4 | % | 6.5 | 6.5 |
|  | Dripping preventing agent | PTFE | % | 0.2 | 0.2 |
|  | Others | COMP | % | 4 | 4 |
|  |  | S-1 | % | 0.1 | 0.1 |
| Properties | Initial flexural strength |  | MPa | 90 | 88 |
|  | Initial impact value |  | J/m | 630 | 390 |
|  | Initial flame retardancy |  | — | V-0 | V-0 |
|  | Long-term accelerated flexural strength |  | MPa | 89 | 85 |
|  | Long-term accelerated impact value |  | J/m | 498 | 120 |
|  | Long-term accelerated flame retardancy |  | — | V-0 | not-V |
|  | Impact value retention ratio |  | % | 79 | 31 |

Ex. = Example,
C. Ex. = Comparative Example

Examples 4–7 and Comparative Examples 4–7

A pulverized material model or a recycled material of the pulverized material model, a polycarbonate resin, a styrene-based resin, a flame retardant, an impact modifier, a reinforcing filler and a dripping preventing agent were mixed to form a composition as shown in Table 3, and the mixture was fed to a 30 mmφ-diameter vented twin-screw extruder (TEX30XSST, supplied by The Japan Steel Works, Ltd.) and melt-extruded at a cylinder temperature of 260° C. to form pellets. The obtained pellets were dried in a hot air circulation dryer at 100° C. for 5 hours and injection-molded with an injection molding machine (SG150U supplied by Sumitomo Heavy Machinery Industries, Ltd.) at a cylinder temperature of 260° C. at a mold temperature 60° C. to give test pieces for evaluation. Table 3 shows evaluation results.

Comparative Example 8

A pulverized material and a polycarbonate resin were mixed to form a composition as shown in Table 4, and the mixture was fed to a 30 mmφ-diameter vented twin-screw extruder (TEX30XSST, supplied by The Japan Steel Works, Ltd.) and melt-extruded at a cylinder temperature of 290° C. to form pellets. The obtained pellets were dried in a hot air circulation dryer at 120° C. for 5 hours and injection-molded with an injection molding machine (SG150U supplied by Sumitomo Heavy Industries, Ltd.) at a cylinder temperature of 290° C. at a mold temperature 70° C. to give test pieces for evaluation. Table 4 shows evaluation results.

Comparative Example 9

A pulverized material, a polycarbonate resin and a flame retardant were mixed to form a composition as shown in Table 4, and the mixture was fed to a 30 mmφ-diameter vented twin-screw extruder (TEX30XSST, supplied by The Japan Steel Works, Ltd.) and melt-extruded at a cylinder temperature of 250° C. to form pellets. The obtained pellets were dried in a hot air circulation dryer at 100° C. for 5 hours and injection-molded with an injection molding machine (SG150U supplied by Sumitomo Heavy Industries, Ltd.) at a cylinder temperature of 250° C. at a mold temperature 60° C. to give test pieces for evaluation. Table 4 shows evaluation results.

TABLE 4

|  | Component |  | Unit | C. Ex. 8 | C. Ex. 9 |
|---|---|---|---|---|---|
| Formulated composition | Pulverized material | RE-1 | % | 20 | 20 |
|  | Polycarbonate resin | PC-1 | % | 80 | 71.8 |
|  | Flame retardant | FR-1 | % | — | 8 |
|  | Dripping preventing agent | PTFE | % | — | 0.2 |

TABLE 3

|  | Component |  | Unit | Ex. 4 | Ex. 5 | Ex. 6 | Ex. 7 | C. Ex. 4 | C. Ex. 5 | C. Ex. 6 | C. Ex. 7 |
|---|---|---|---|---|---|---|---|---|---|---|---|
| A | Pulverized material | MS-1 | % | — | — | — | — | 20 | — | — | — |
|  |  | MS-1-1 | % | — | — | — | — | — | 20 | — | — |
|  |  | MS-1-2 | % | — | — | — | — | — | — | 20 | — |
|  |  | MS-1-3 | % | — | — | — | — | — | — | — | 20 |
|  |  | MS-2 | % | 20 | — | — | — | — | — | — | — |
|  |  | MS-2-1 | % | — | 20 | — | — | — | — | — | — |
|  |  | MS-2-2 | % | — | — | 20 | — | — | — | — | — |
|  |  | MS-2-3 | % | — | — | — | 20 | — | — | — | — |
|  | Polycarbonate resin | PC-1 | % | 53.36 | 53.36 | 53.36 | 53.36 | — | — | — | — |
|  |  | PC-2 | % | — | — | — | — | 54.96 | 54.96 | 54.96 | 54.96 |
|  | Styrene-based resin | ST-1 | % | 12.8 | 12.8 | 12.8 | 12.8 | 12.8 | 12.8 | 12.8 | 12.8 |
|  | Impact modifier | MD-1 | % | 4 | 4 | 4 | 4 | 4 | 4 | 4 | 4 |
|  | Flame retardant | FR-4 | % | 8 | 8 | 8 | 8 | 8 | 8 | 8 | 8 |
|  | Reinforcing agent | TD | % | 1.6 | 1.6 | 1.6 | 1.6 | — | — | — | — |
|  | Dripping preventing agent | PTFE | % | 0.24 | 0.24 | 0.24 | 0.24 | 0.24 | 0.24 | 0.24 | 0.24 |
| B | Initial flexural strength |  | MPa | 92 | 92 | 91 | 91 | 92 | 90 | 90 | 90 |
|  | Initial impact value |  | J/m | 443 | 442 | 437 | 433 | 338 | 320 | 311 | 302 |
|  | Initial flame retardancy |  | — | V-0 | V-0 | V-0 | V-0 | V-1 | V-1 | V-1 | V-1 |
|  | Long-term accelerated flexural strength | | MPa | 91 | 91 | 91 | 90 | 89 | 88 | 88 | 87 |
|  | Long-term accelerated impact value | | J/m | 368 | 362 | 354 | 346 | 47 | 38 | 31 | 27 |
|  | Long-term accelerated flame retardancy | | — | V-0 | V-0 | V-0 | V-0 | V-1 | not-V | not-V | not-V |
|  | Impact value retention ratio |  | % | 82 | 82 | 81 | 80 | 14 | 12 | 10 | 9 |

A: Formulated composition
B: Properties
Ex. = Example,
C. Ex. = Comparative Example TABLE 4-continued

| | Component | Unit | C. Ex. 8 | C. Ex. 9 |
|---|---|---|---|---|
| Properties | Initial flexural strength | MPa | 89 | 83 |
| | Initial impact value | J/m | 205 | 69 |
| | Initial flame retardancy | — | — | V-0 |
| | Long-term accelerated flexural strength | MPa | 90 | 80 |
| | Long-term accelerated impact value | J/m | 92 | 33 |
| | Long-term accelerated flame retardancy | — | — | V-2 |
| | Impact value retention ratio | % | 45 | 48 |

C. Ex. = Comparative Example

Examples 8–17 and Comparative Examples 10–15

A pulverized material, a polycarbonate resin, a styrene-based resin, a flame retardant, a reinforcing agent, a dripping preventing agent and 0.6 part by weight, per 100 parts by weight of the above components, of SL-900 (supplied by Riken Vitamin Co., Ltd.), which was a mixture of a fatty acid alkyl wax and triglyceride (mixing ratio (weight)=70:30) as a lubricant and a mold release agent, were mixed to form a composition as shown in Table 5 or 6, and the mixture was fed to a 30 mmφ-diameter vented twin-screw extruder (TEX30XSST, supplied by The Japan Steel Works, Ltd.) and melt-extruded at a cylinder temperature of 250° C. to form pellets. The obtained pellets were dried in a hot air circulation dryer at 100° C. for 5 hours and injection-molded with an injection molding machine. (SG150U supplied by Sumitomo Heavy Industries, Ltd.) at a cylinder temperature of 250° C. at a mold temperature 60° C. to give test pieces for evaluation. Tables 5 and 6 show evaluation results.

TABLE 5

| | Component | | Unit | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|
| A | Pulverized material | RE-2 | % | 30 | 30 | — | — | — | — | — | — | — | — |
| | | RE-3 | % | — | — | 20 | 40 | 20 | 20 | 40 | 20 | 30 | 20 |
| | | RE-4 | % | — | — | — | — | — | — | — | — | — | — |
| | | RE-5 | % | — | — | — | — | — | — | — | — | — | — |
| | Polycarbonate resin | PC-1 | % | 70 | 58.8 | 80 | 60 | 54.56 | 52.64 | 39.48 | 52.76 | 50.7 | 52.64 |
| | Styrene-based resin | ST-1 | % | — | — | — | — | 14.4 | 12 | 9 | 10 | 10 | 12 |
| | Flame retardant | FR-1 | % | — | — | — | — | — | — | — | — | 6 | — |
| | | FR-2 | % | — | 8 | — | — | 8 | 8 | 6 | 8 | — | — |
| | | FR-3 | % | — | — | — | — | — | — | — | — | — | 8 |
| | Impact modifier | MD-1 | % | — | 3 | — | — | 2.8 | 3.12 | 2.34 | — | — | — |
| | | MD-2 | % | — | — | — | — | — | — | — | 5 | 3 | — |
| | | MD-3 | % | — | — | — | — | — | — | — | — | — | 3.12 |
| | Reinforcing agent | TD | % | — | — | — | — | — | 4 | 3 | 4 | — | 4 |
| | Dripping preventing agent | PTFE | % | — | 0.2 | — | — | 0.24 | 0.24 | 0.18 | 0.24 | 0.3 | 0.24 |
| B | Initial flexural strength | | MPa | 87 | 86 | 89 | 87 | 90 | 90 | 90 | 89 | 88 | 90 |
| | Initial impact value | | J/m | 433 | 458 | 460 | 398 | 310 | 320 | 318 | 334 | 310 | 312 |
| | Initial flame retardancy | | — | — | — | V-0 | — | — | V-0 | V-0 | V-0 | V-0 | V-0 | V-0 |
| | Long-term accelerated flexural strength | | MPa | 79 | 80 | 90 | 88 | 90 | 90 | 91 | 90 | 88 | 91 |
| | Long-term accelerated impact value | | J/m | 332 | 307 | 330 | 265 | 202 | 245 | 242 | 257 | 192 | 243 |
| | Long-term accelerated flammability | | — | — | — | V-0 | — | — | V-0 | V-0 | V-0 | V-0 | V-0 | V-0 |
| | Impact value retention ratio | | % | 77 | 67 | 72 | 67 | 65 | 77 | 76 | 77 | 63 | 78 |

A = Formulated composition,
B = Properties
Ex. = Example

TABLE 6

| | Component | | Unit | C. Ex. 10 | C. Ex. 11 | C. Ex. 12 | C. Ex. 13 | C. Ex. 14 | C. Ex. 15 |
|---|---|---|---|---|---|---|---|---|---|
| A | Pulverized material | RE-2 | % | — | — | — | — | — | — |
| | | RE-3 | % | — | — | — | — | — | — |
| | | RE-4 | % | 10 | 20 | 20 | — | — | — |
| | | RE-5 | % | — | — | — | 20 | 40 | 100 |
| | Polycarbonate resin | PC-1 | % | 90 | 80 | 54.56 | 54.56 | 60 | — |
| | Styrene-based resin | ST-1 | % | — | — | 14.4 | 14.4 | — | — |
| | Flame retardant | FR-1 | % | — | — | — | — | — | — |
| | | FR-2 | % | — | — | 8 | 8 | — | — |
| | | FR-3 | % | — | — | — | — | — | — |
| | Impact modifier | MD-1 | % | — | — | 2.8 | 2.8 | — | — |
| | | MD-2 | % | — | — | — | — | — | — |
| | | MD-3 | % | — | — | — | — | — | — |

TABLE 6-continued

| | Component | | Unit | C. Ex. 10 | C. Ex. 11 | C. Ex. 12 | C. Ex. 13 | C. Ex. 14 | C. Ex. 15 |
|---|---|---|---|---|---|---|---|---|---|
| | Reinforcing agent | TD | % | — | — | — | — | — | — |
| | Dripping preventing agent | PTFE | % | — | — | 0.24 | 0.24 | — | — |
| B | Initial flexural strength | | MPa | 88 | 87 | 89 | 84 | 81 | 75 |
| | Initial impact value | | J/m | 450 | 434 | 278 | 198 | 166 | 54 |
| | Initial flame retardancy | | — | — | — | V-0 | V-0 | — | HB |
| | Long-term accelerated flexural strength | | MPa | 83 | 82 | 86 | 78 | 71 | 60 |
| | Long-term accelerated impact value | | J/m | 45 | 39 | 68 | 61 | 39 | 13 |
| | Long-term accelerated flammability | | — | — | — | V-1 | V-1 | — | HB |
| | Impact value retention ratio | | % | 10 | 9 | 24 | 31 | 23 | 24 |

A = Formulated composition,
B = Properties
C. Ex. = Comparative Example

Examples 18 and 19

A molded article pulverized material, an aromatic polycarbonate resin, styrene-based resin pellets, an impact modifier, a flame retardant, a reinforcing material, a dripping preventing agent and a colorant were strands-extruded by a feed method shown in Table 7 to form a composition shown in Table 7, and the strands were cooled in a water vessel and granulated with a strand cutter to give pellets. The obtained pellets were dried in a hot air circulation dryer at 100° C. for 5 hours and injection-molded with an injection molding machine (SG150U supplied by Sumitomo Heavy Industries, Ltd.) at a cylinder temperature of 250° C. at a mold temperature 60° C. to give test pieces for evaluation.

Table 7 shows compositions of materials fed to the extruder and evaluation results, and Table 9 shows analysis results of the compositions of molded article pulverized materials.

The condition of kneading with an extruder was set as follows. As an extruder, a 30 mmϕ-diameter vented twin-screw extruder (TEX30XSST, supplied by The Japan Steel Works, Ltd.) was used. Above a first feed port, a cassette weighing feeder (CWF-1) that was a material feeder with a twin-screw (CE-T-1 OS01; supplied by Kubota, Corp.) was mounted. A side feeder having a twin screw was connected to a second feed port halfway along the extruder, and further, two cassette weighing feeders (CWF-2 and CWF-3) that were material feeders with a twin screw each were mounted above the side feeder. Each cassette weighing feeder was connected to a feed control unit to control the feed amount of each. Further, the output total was set at 20,000 g/hour. Concerning extrusion temperatures, the temperature in zones from the first feed port up to the side feeder was set at 250° C., and the temperature in zones thereafter was set at 225° C. The extrusion was carried out at a screw revolution speed of 180 rpm and at a vent vacuum degree of 3 kPa.

Example 20

A pulverized material, a polycarbonate resin, polyethylene terephthalate resin pellets (that had been dried with hot air at 120° C. for 5 hours), an impact modifier, a flame retardant and a dripping preventing agent extruded by a feed method shown in Table 7 to form a composition shown in Table 7 in the same manner as in Example 18 except that the extrusion temperature in zones from the first feed port up to the side feeder was set at 260° C. and that the temperature in zones thereafter was set at 245° C., to obtain pellets. The thus-obtained pellets were dried in a hot air circulation dryer at 120° C. for 5 hours and injection-molded with an injection molding machine (SG150U supplied by Sumitomo Heavy Industries, Ltd.) at a cylinder temperature of 260° C. at a mold temperature 60° C. to give test pieces for evaluation. Table 7 shows compositions of materials fed to the extruder and evaluation results, and Table 9 shows analysis results of the compositions of molded article pulverized materials.

TABLE 7

| Material feeding method | | | | | Example | | |
|---|---|---|---|---|---|---|---|
| Feed port | Feeder | Component | | Unit | 18 | 19 | 20 |
| First feeder | CWF-1 | Polycarbonate resin PC-1 | | % | 44.8 | 39.3 | 26.8 |
| | | Impact modifier | MD-1 | % | 4 | — | 5 |
| | | | MD-2 | % | — | 3.5 | — |
| | | Flame retardant | FR-2 | % | 8 | — | — |
| | | | FR-3 | % | — | 7 | — |
| | | | FR-5 | % | — | — | 10 |
| | | Reinforcing material | TD | % | 4 | — | — |
| | | Dripping preventing agent | PTFE | % | 0.2 | 0.2 | 0.2 |
| | | Colorant master | DC-1 | % | 3 | — | — |
| | | | DC-2 | % | — | 2 | — |
| Second feeder | CWF-2 | Pulverized material | RE-6 | % | 20 | — | — |
| | | | RE-7 | % | — | 30 | — |
| | | | RE-8 | % | — | — | 40 |
| | CWF-3 | Styrene-based resin | ST-1 | % | 16 | 18 | — |
| | | Polyester resin | PET | % | — | — | 18 |

TABLE 7-continued

| Material feeding method | | | | Example | | |
|---|---|---|---|---|---|---|
| Feed port | Feeder | Component | Unit | 18 | 19 | 20 |
| Properties | | Initial flexural strength | MPa | 90 | 88 | 90 |
| | | Initial impact value | J/m | 318 | 322 | 610 |
| | | Initial flame retardancy | — | V-0 | V-0 | V-0 |
| | | Long-term accelerated flexural strength | MPa | 90 | 89 | 89 |
| | | Long-term accelerated impact value | J/m | 245 | 219 | 476 |
| | | Long-term accelerated flammability | — | V-0 | V-0 | V-0 |
| | | Impact value retention ratio | % | 77 | 68 | 78 |

Symbols attached to the pulverized material, the resin, the flame retardant and the additives in Tables 1 to 9 mean as follows.

(Molded Article Pulverized Material Model Containing Polycarbonate Resin)

MS-1: 68.7% by weight of a polycarbonate resin indicated by symbol PC-2 below and 10% by weight of CR-733S (phosphoric ester oligomer) supplied by Daihachi Chemical Industry Co., Ltd. as a phosphoric ester, were homogeneously mixed, and then the homogeneous mixture was mixed with 16% by weight of an ABS resin indicated by symbol ST-1 below, 5% by weight of a rubber elastomer indicated as MD-1 and 0.3% by weight of a dripping preventing agent indicated as PTFE. The resultant mixture was charged into a 30 mmφ-diameter vented twin-screw extruder (TEX30XSST, supplied by The Japan Steel Works, Ltd.) and melt-extruded at a cylinder temperature of 260° C. to form pellets. The obtained pellets were dried in a hot air circulation dryer at 100° C. for 5 hours and injection-molded with an injection molding machine (SG150U supplied by Sumitomo Heavy Industries, Ltd.) at a cylinder temperature of 260° C. at a mold temperature 60° C. to give molded articles having a side length of 150 mm each and a thickness of 3 mm for evaluation. Then, the molded article was allowed to stand in a constant-temperature constant-humidity tester (Platinous F supplied by Tabai Espec Corp.) under conditions of 65° C. and 85% RH for 1,000 hours, to give molded articles whose degradation was accelerated under a wet heat environment. Then, the thus-treated molded articles were pulverized with a pulverizer (SB-210; supplied by Horai Co., Ltd.) at a process performance rate of 70 kg/hour, and uniformly blended with a V-shaped blender to give a molded article pulverized material model (MS-1). MS-1 had a viscosity average molecular weight of 21,500 and a wet heat retention ratio of 55%.

MS-2: A molded article pulverized material model (MS-2) was obtained by carrying out molding, wet heat treatment and pulverization in the same manner as in the preparation of MS-1 except that 68.7% by weight of the polycarbonate resin indicated by symbol PC-2 was replaced with 66.7% by weight of a polycarbonate resin indicated by symbol PC-1 and 2% by weight of TD. MS-2 had a viscosity average molecular weight of 21,800 and a wet heat retention ratio of 86%.

MS-3: 95.3% by weight of a polycarbonate resin indicated by symbol PC-2 below, 4% by weight of a silicone-based flame retardant (XC99-B5664; supplied by Toshiba Silicone), 0.4% by weight of potassium salt of N-(p-tolyl-sulfonyl)-p-toluenesulfoimide and 0.3% by weight of PTFE (dripping preventing agent) were homogeneously mixed. The resultant mixture was charged into a 30 mmφ-diameter vented twin-screw extruder (TEX30XSST, supplied by The Japan Steel Works, Ltd.) and melt-extruded at a cylinder temperature of 290° C. to form pellets. The obtained pellets were dried in a hot air circulation dryer at 120° C. for 5 hours and injection-molded with an injection molding machine (SG150U supplied by Sumitomo Heavy Industries, Ltd.) at a cylinder temperature of 290° C. at a mold temperature 80° C. to give molded articles having a side length of 150 mm each and a thickness of 3 mm for evaluation. Then, the molded articles were allowed to stand in a constant-temperature constant-humidity tester (Platinous F supplied by Tabai Espec Corp.) under conditions of 65° C. and 85% RH for 1,000 hours, to give molded articles whose degradation was accelerated under a wet heat environment. Then, the thus-treated molded articles were pulverized with a pulverizer (SB-210; supplied by Horai Co., Ltd.) at a process performance rate of 70 kg/hour, and uniformly blended with a V-shaped blender to give a molded article pulverized material model (MS-3). MS-3 had a viscosity average molecular weight of 21,800 and a wet heat retention ratio of 58%.

MS-4: A molded article pulverized material model (MS-4) was obtained by carrying out molding of 97.64% by weight of the following symbol PC-1 (polycarbonate resin), 2% by weight of a silicone-based flame retardant (X-40-9243; supplied by Shin-Etsu Chemical Co., Ltd.), 0.01% by weight of an alkali metal salt-based flame retardant (Megafac F-114P; supplied by Dainippon Ink & Chemicals, Inc.), 0.3% by weight of PTFE (dripping preventing agent) and 0.05% by weight of S-1 (phosphite-based antioxidant) and wet heat treatment and pulverization in the same manner as in the preparation of MS-3. MS-4 had a viscosity average molecular weight of 19,100 and a wet heat retention ratio of 88%.

MS-5: 62.6% by weight of the following symbol PC-2 (polycarbonate resin), 16.7% by weight of PET (polyethylene terephthalate), 1% by weight of PBT (polybutylene terephthalate), 4.2% by weight of SIS (styrene-based elastomer), 5.8% by weight of COMP (additive containing a polyester-styrene-based elastomer copolymer), 9.2% by weight of FR-4 (flame retardant), 0.4% by weight of PTFE (dripping preventing agent) and 0.1% by weight of S-1 (stabilizer) were homogeneously mixed. Then, the resultant mixture was charged into a 30 mmφ-diameter vented twin-screw extruder (TEX30XSST, supplied by The Japan Steel Works, Ltd.) and melt-extruded at a cylinder temperature of 290° C. to form pellets. The obtained pellets were dried in a hot air circulation dryer at 105° C. for 5 hours and injection-molded with an injection molding machine (SG150U supplied by Sumitomo Heavy Industries, Ltd.) at a cylinder temperature of 270° C. at a mold temperature 70° C. to give molded articles having a side length of 150 mm each and a thickness of 3 mm for evaluation. Then, the molded articles were allowed to stand in a constant-temperature constant-humidity tester (Platinous F supplied by Tabai Espec Corp.) under conditions of 65° C. and 85% RH for 1,000 hours, to give molded articles whose degradation was accelerated under a wet heat environment. Then, the thus-treated molded articles were pulverized with a pulverizer (SB-210; supplied by Horai Co., Ltd.) at a process performance rate of 70 kg/hour, and uniformly blended with a V-shaped blender to give a molded article pulverized material model (MS-5). MS-5 had a viscosity average molecular weight of 14,300 and a wet heat retention ratio of 53%.

MS-6: A molded article pulverized material model (MS-6) was obtained by carrying out molding, wet heat treatment and pulverization in the same manner as in the preparation of MS-5 except that PC-2 was replaced with PC-1, that 9.2% by weight of FR-4 (flame retardant) was replaced with 8.4% by weight of FR-3 (flame retardant) and 0.8% by weight of TD. MS-6 had a viscosity average molecular weight of 18,400 and a wet heat retention ratio of 84%.

(Repeatedly Regenerated Pulverized Material of Molded Article Pulverized Material Model Containing Polycarbonate Resin)

MS-1-1: MS-1, a polycarbonate resin, a styrene-based resin, a flame retardant, an impact modifier and a dripping preventing agent were mixed in an amount ratio shown in Table 1, and the resultant mixture was charged into a 30 mmϕ-diameter vented twin-screw extruder (TEX30XSST, supplied by The Japan Steel Works, Ltd.) and melt-extruded at a cylinder temperature of 260° C. to form pellets. The obtained pellets were dried in a hot air circulation dryer at 100° C. for 5 hours and injection-molded with an injection molding machine (SG150U supplied by Sumitomo Heavy Industries, Ltd.) at a cylinder temperature of 260° C. at a die temperature 60° C. to give molded articles having a side length of 150 mm each and a thickness of 3 mm for evaluation. Then, the molded articles were allowed to stand in a constant-temperature constant-humidity tester (Platinous F supplied by Tabai Espec Corp.) under conditions of 65° C. and 85% RH for 1,000 hours, to give molded articles whose degradation was accelerated under a wet heat environment. Then, the thus-treated molded articles were pulverized with a pulverizer (SB-210; supplied by Horai Co., Ltd.) at a process performance rate of 70 kg/hour, and uniformly blended with a V-shaped blender to give a first-regeneration pulverized material (MS-1-1) of a molded article pulverized material model. MS-1-1 had a viscosity average molecular weight of 21,200 and a wet heat retention ratio of 51%.

MS-1-2: A second-regeneration pulverized material (MS-1-2) of a molded article pulverized material model was obtained in the same manner as in the preparation of MS-1-1 except that the pulverized material MS-1 was replaced with MS-1-1. MS-1-2 had a viscosity average molecular weight of 21,000 and a wet heat retention. ratio of 50%.

MS-1-3: A third-regeneration pulverized material (MS-1-3) of a molded article pulverized material model was obtained in the same manner as in the preparation of MS-1-1 except that the pulverized material MS-1 was replaced with MS-1-2. MS-1-3 had a viscosity average molecular weight of 20,800 and a wet heat retention ratio of 48%.

MS-2-1: MS-2, a polycarbonate resin, a styrene-based resin, a flame retardant, an impact modifier, a reinforcing filler and a dripping preventing agent were mixed in an amount ratio shown in Table 1, and the resultant mixture was charged into a 30 mmϕ-diameter vented twin-screw extruder (TEX30XSST, supplied by The Japan Steel Works, Ltd.) and melt-extruded at a cylinder temperature of 260° C. to form pellets. The obtained pellets were dried in a hot air circulation dryer at 100° C. for 5 hours and injection-molded with an injection molding machine (SG150U supplied by Sumitomo Heavy Industries, Ltd.) at a cylinder temperature of 260° C. at a mold temperature 60° C. to give molded articles having a side length of 150 mm each and a thickness of 3 mm for evaluation. Then, the molded articles were allowed to stand in a constant-temperature constant-humidity tester (Platinous F supplied by Tabai Espec Corp.) under conditions of 65° C. and 85% RH for 1,000 hours, to give molded articles whose degradation was accelerated under a wet heat environment. Then, the thus-treated molded articles were pulverized with a pulverizer (SB-210; supplied by Horai Co., Ltd.) at a process performance rate of 70 kg/hour, and uniformly blended with a V-shaped blender to give a first-regeneration pulverized material (MS-2-1) of a molded article pulverized material model. MS-2-1 had a viscosity average molecular weight of 21,700 and a wet heat retention ratio of 84%.

MS-2-2: A second-regeneration pulverized material (MS-2-2) of a molded article pulverized material model was obtained in the same manner as in the preparation of MS-2-1 except that the pulverized material MS-2 was replaced with MS-2-1. MS-2-2 had a viscosity average molecular weight of 21,600 and a wet heat retention ratio of 83%.

MS-2-3: A third-regeneration pulverized material (MS-2-3) of a molded article pulverized material model was obtained in the same manner as in the preparation of MS-2-1 except that the pulverized material MS-2 was replaced with MS-2-2. MS-2-3 had a viscosity average molecular weight of 21,400 and a wet heat retention ratio of 81%.

(Molded Article Pulverized Material Containing Polycarbonate Resin)

Table 8 shows analysis results of from RE-1 to RE-5, and Table 9 shows analysis results of from RE-6 to RE-8.

TABLE 8

|  | Analysis method | Unit, etc. | RE-1 | RE-2 | RE-3 | RE-4 | RE-5 |
|---|---|---|---|---|---|---|---|
| (i) | Main resin | — | Polycarbonate resin | Polycarbonate resin Diene-based rubber such rubber such as MBS resin, etc. | Polycarbonate resin Diene-based rubber such as ABS resin, etc. | Polycarbonate resin Diene-based as ABS resin | Polycarbonate resin Diene-based rubber such as ABS resin |
| (ii) | Residue of hydrazine decomposition | wt % | 0.3 | 5 | 25 | 22 | 22 |
| (iii) | Ashed residue | wt % | 0.3 | 0 | 0.7 | 0.7 | 0.7 |
| (iv) | Diene-based rubber amount | wt % | — | 2.8 | 2.5 | 2.8 | 2.8 |

TABLE 8-continued

| | Analysis method | Unit, etc. | RE-1 | RE-2 | RE-3 | RE-4 | RE-5 |
|---|---|---|---|---|---|---|---|
| (v) | Contents of residue of hydrazine decomposition | — | — | Methyl methacrylate Butadiene — — — | Acrylonitrile Styrene Butadiene Methyl methacrylate 2-ethylhexyl acrylate — | Acrylonitrile Styrene Butadiene Methyl methacrylate Butyl acrylate Cyclic dimethyl siloxane | Acrylonitrile Styrene Butadiene Methyl methacrylate Butyl acrylate Cyclic dimethyl siloxane |
| (vi) | Observation for inorganic components, etc. | — | Inorganic pigment | Carbon black | Inorganic pigment | Inorganic pigment | Inorganic pigment |
| (vii) | Type of phosphoric ester (★) | X | — | Derived from resorcinol | Derived from resorcinol | Derived from resorcinol | Derived from resorcinol |
| | | $R^1$–$R^4$ | — | Derived from xylenol | Derived from xylenol | Derived from phenol | Derived from phenol |
| | Phosphoric ester amount | wt % | — | 10 | 10 | 9 | 9 |
| (viii) | PTFE-corresponding amount | wt % | — | 0.2 | 0.3 | 0.3 | 0.3 |
| | Viscosity average molecular weight | — | 16,100 | 19,000 | 18,100 | 19,300 | 16,300 |
| | Wet heat retention ratio | % | 90 | 87 | 85 | 52 | 43 |

★X and $R^1$ to $R^4$ correspond to symbols in the general formula (4).

TABLE 9

| | Analysis methods | Unit, etc. | RE-6 | RE-7 | RE-8 |
|---|---|---|---|---|---|
| (i) | Main resin | — | Polycarbonate resin Diene-based rubber such as ABS resin | Polycarbonate resin Diene-based rubber such as ABS resin | Polycarbonate resin Polyethylene terephthalate resin |
| (ii) | Residue of hydrazine decomposition | wt % | 25.0 | 22.2 | 10.2 |
| (iii) | Ashed residue | wt % | 6.2 | 0.7 | 1.9 |
| (iv) | Diene-based rubber amount | wt % | 2.5 | 2.8 | 6.2 |
| (v) | Contents of residue of hydrazine decomposition | — | Acrylonitrile Styrene Butadiene Methyl methacrylate 2-Ethylhexyl acrylate — | Acrylonitrile Styrene Butadiene Methyl methacrylate Butyl acrylate Cyclic dimethyl siloxane | — — Butadiene Methyl methacrylate — — |
| (vi) | Observation for inorganic components, etc. | — | Inorganic pigment, talc | Inorganic pigment | Inorganic pigment |
| (vii) | Type of phosphoric ester (★) | X | Derived from resorcinol | Derived from bisphenol A | — |
| | | $R^1$–$R^4$ | Derived from xylenol | Derived from phenol | — |
| | Phosphoric ester amount | wt % | 10 | 9 | — |
| (viii) | PTFE-corresponding amount | wt % | 0.3 | 0.3 | 0.3 |
| (ix) | Presence of bromine compound | — | No | No | Yes |
| (x) | Amount of bromine compound | wt % | — | — | 8 |
| (xi) | Polycarbonate/poly-ester amount ratio (weight ratio) | — | — | — | 65/35 |
| | Viscosity average molecular weight | — | 18,900 | 17,700 | 20,300 |
| | Wet heat retention ratio | % | 88 | 80 | 88 |

★X and $R^1$ to $R^4$ correspond to symbols in the general formula (4).

RE-1: A polycarbonate resin molded article used as a cover of a bathroom lamp sold on market was washed with tap water, dried with a hot air dryer and then pulverized with a pulverizer (SB-210; supplied by Horai Co., Ltd.) at a process performance rate of 70 kg/hour, and the pulverized material was uniformly blended with a V-shaped blender to give a pulverized material (RE-1). RE-1 was composition-analyzed to show results as shown in Table 8. RE-1 had a viscosity average molecular weight of 16,100 and a wet heat retention ratio of 90%.

RE-2: A molded article used as a battery pack of a notebook computer sold on market was washed with water, dried, pulverized and blended in the same manner as in the preparation of RE-1, to obtain a pulverized material (RE-2). RE-2 was composition-analyzed to show results as shown in Table 8. RE-2 had a viscosity average molecular weight of 19,000 and a wet heat retention ratio of 87%.

RE-3: A molded article that was used as a housing of a notebook computer sold on market and had a conductive coating film and a metal plating film was immersed in an aqueous nitric acid solution, and the molded article was washed with water to obtain a molded article from which metal components were removed. Then, the molded article was pulverized and blended in the same manner as in the preparation of RE-1, to obtain a pulverized material (RE-3). RE-3 was composition-analyzed to show results as shown in Table 8. RE-3 had a viscosity average molecular weight of 18,100 and a wet heat retention ratio of 85%.

RE-4: A molded article used as a housing of a copying machine sold on market was washed with water, dried, pulverized and blended in the same manner as in the preparation of RE-1, to obtain a pulverized material (RE-4). RE-4 was composition-analyzed to show results as shown in Table 8. RE-4 had a viscosity average molecular weight of 19,300 and a wet heat retention ratio of 52%.

RE-5: A molded article used as a housing of a printer sold on market was washed with water, dried, pulverized and blended in the same manner as in the preparation of RE-1, to obtain a pulverized material (RE-5). RE-5 was composition-analyzed to show results as shown in Table 8, and it was found to be almost similar to RE-4. RE-5 had a viscosity average molecular weight of 16,300 and a wet heat retention ratio of 43%.

RE-6: A molded article that was used as a housing of a notebook computer sold on market and had a conductive coating film and a metal plating film was immersed in an aqueous nitric acid solution, and the molded article was washed with water to obtain a light-gray molded article from which metal components were removed. The molded article was washed with water, dried, pulverized and blended in the same manner as in the preparation of RE-1, to obtain a pulverized material (RE-6). RE-6 was composition-analyzed to show results as shown in Table 9. RE-6 had a viscosity average molecular weight of 18,900 and a wet heat retention ratio of 88%.

RE-7: A housing molded article (colored in ivory) of a copying machine was washed with water, dried, pulverized and blended in the same manner as in the preparation of RE-1, to obtain a pulverized material (RE-7). RE-7 was composition-analyzed to show results as shown in Table 9. RE-7 had a viscosity average molecular weight of 17,700 and a wet heat retention ratio of 80%.

RE-8: A molded article (colored in black) forming an internal part of a printer was washed with water, dried, pulverized and blended in the same manner as in the preparation of RE-1, to obtain a pulverized material (RE-8). RE-8 was composition-analyzed to show results as shown in Table 9. RE-8 had a viscosity average molecular weight of 20,300 and a wet heat retention ratio of 88%.

(Polycarbonate Resin)

PC-1: Polycarbonate resin
L-1225WP (viscosity average molecular weight 22,500); supplied by Teijin Chemicals, Ltd.

PC-2: Polycarbonate resin
K-1300W (viscosity average molecular weight 30,000); supplied by Teijin Chemicals, Ltd.

(Styrene-Based Resin)

ST-1: ABS resin
Santac UT-61; supplied by Nippon A & L. Inc.

(Polyester Resin)

PET: Polyethylene terephthalate resin
TR-8580H; supplied by Teijin Limited.

PBT: Polybutylene terephthalate resin
TRB-J; supplied by Teijin Limited.

(Flame Retardant)

FR-1: Triphenyl phosphate
TPP; supplied by Daihachi Chemical Industry, Co., Ltd.

FR-2: Resorcinol bis(dixylenyl phosphate)
Adekastab FP-500; supplied by Asahi Denka Kogyo K.K.

FR-3: Bisphenol A bis(diphenyl phosphate)
CR-741; supplied by Daihachi Chemical Industry, Co., Ltd.

FR-4: Resorcinol bis(diphenyl phosphate)
CR-733S; supplied by Daihachi Chemical Industry, Co., Ltd.

FR-5: Carbonate oligomer of tetrabromobisphenol A
Fireguard FG-7000, supplied by Teijin Chemicals, Ltd.

(Rubber Elastomer)

MD-1: Methyl methacrylate-ethyl acrylate-butadiene copolymer
Paraloid EXL-2602, supplied by Kureha Chemical Industry, Co., Ltd.

MD-2: 2-Ethylhexyl acrylate-butadiene-methyl methacrylate-styrene multistep polymerized graft copolymer
HIA-15; supplied by Kureha Chemical Industry, Co., Ltd.

MD-3: Composite elastomer of polyorganosiloxane rubber component and polyalkyl (meth)acrylate rubber component
Metablen S-2001; supplied by Mitsubishi Rayon Co., Ltd.

SIS: Thermoplastic styrene elastomer
Septon 2005; supplied by Kuraray Co., Ltd.

(Reinforcing Filler)

TD: Talc
HS-T0.8 (average particle diameter, approximately 5 μm, measured by a laser diffraction method) supplied by Hayashi Kasei Co., Ltd.

(Dripping Preventing Agent)

PTFE: Polytetrafluoroethylene having fibril formability
Polyfureon MPA FA-500; supplied by Daikin Industries, Ltd.

(Others)

COMP: additive containing a polyester-styrene based elastomer copolymer
TK-S7300; supplied by Kuraray Co., Ltd.

S-1: Phosphite antioxidant
IRGAFOS168; supplied by Ciba-Geigy Japan Ltd.

(Colorant Master)

DC-1: Dry color master that is a mixture prepared by homogeneously mixing the following dyes or pigments (i) to (v) and PC-1 with a super mixer. Parenthesized weight percentages is a percentage when the DC-1=100% by weight.
  (i) PC-1 (65.6067% by weight)
  (ii) RTC30 (33.3333% by weight)
  (Titanium oxide; R-TC30 supplied by Tioxide Japan. Oxide Japan.
  (iii) CB970 (0.6933% by weight)
  (Carbon black; Carbon Black #970 supplied by Mitsubishi Chemical Corporation.).
  (iv) Y8010 (0.2000% by weight)
  (Yellow dye; Plast Yellow 8010, supplied by Arimoto Chemical Co., Ltd.).
  (v) R8360 (0.1667% by weight)
  (Red dye; Plast Red 8360, supplied by Arimoto Chemical Co., Ltd.).

DC-2: Dry color master that is a mixture prepared by homogeneously mixing the following dyes or pigments (vi) to (x) and PC-1 with a super mixer. Parenthesized weight percentages is a percentage when the DC-2=100% by weight.
  (vi) PC-1 (47.673% by weight)

(vii) RL-91 (50.000% by weight)
(Titanium oxide; TIONA RL-91, supplied by Millennium Inorganic Chem.)
(viii) CB970 (0.111% by weight)
(Carbon black; Carbon Black #970 supplied by Mitsubishi Chemical Corporation).
(ix) Y118S (2.171% by weight)
Titanium Yellow; Ferro Color 42-118S, supplied by Ferro Enamels Japan Ltd.).
(x) R8370 (0.045% by weight)
(Red dye; Plast Red 8370, supplied by Arimoto Chemical Co., Ltd.).

EFFECT OF THE INVENTION

The regenerated resin composition of the present invention has excellent properties of an aromatic polycarbonate resin, and it is excellent in initial mechanical strength, particularly impact resistance, and excellent in effect of retaining mechanical strength and flame retardancy for a long period of time. Therefore, not only it enables efficient recycling of molded articles made of a polycarbonate resin that is from used and discarded products such as electric and electronic machines and equipment, office automation machines and equipment, and the like, but also it has properties sufficient for re-use in these products, so that it is very useful in view of environmental protection and re-use of resources and produces a remarkable industrial effect.

The invention claimed is:

1. A method for producing a regenerated resin composition comprising a pulverized material (Component A) and an aromatic polycarbonate resin (Component B), the method comprising,
   (i) collecting a molded article made of resin composition containing an aromatic polycarbonate resin,
   (ii) removing a material derived from surface processing of the molded article,
   (iii) pulverizing the molded article to obtain a pulverized material,
   (iv) selecting a pulverized material (Component A) satisfying the following conditions:
      (1) that the pulverized material is a pulverized material of a molded article having an aromatic polycarbonate resin content of 30 to 98% by weight,
      (2) that the pulverized material has a viscosity average molecular weight of 17,000 to 30,000,
      (3) that the pulverized material has a wet heat retention ratio of at least 60%, and
   (v) mixing the pulverized material (Component A) with an aromatic polycarbonate resin (Component B).

2. The method of claim 1, wherein the material derived from surface processing is selected from the group consisting of a material of a printing film, a seal, a label, a face coating film, a conductive coating, a conductive plating and vapor deposition.

3. The method of claim 1, wherein the regenerated resin composition has a pulverized material (Component A) content of 5 to 60% by weight and an aromatic polycarbonate resin (Component B) content of 5 to 90% by weight.

4. The method of claim 1, wherein the pulverized material (Component A) has a wet heat retention ratio of at least 70%.

5. The method of claim 1, wherein the pulverized material (Component A) contains a styrene-based resin (Component A-2-PS) or an aromatic polyester resin (Component A-2-PE).

6. The method of claim 5, wherein the pulverized material (Component A) contains 1 to 65% by weight of Component A-2-PS or Component A-2-PE.

7. The method of claim 1, wherein the pulverized material (Component A) contains a flame retardant (Component A-3).

8. The method of claim 7, wherein the pulverized material (Component A) contains 1 to 30% by weight of a phosphoric ester (Component A-3-a) as a flame retardant.

9. The method of claim 1, wherein the pulverized material (Component A) has an aromatic polycarbonate resin (Component A-1) content of 40 to 90% by weight.

10. The method of claim 1, wherein the pulverized material (Component A) has a viscosity average molecular weight of 18,000 to 26,000.

11. The method of claim 1, wherein the regenerated resin composition has a pulverized material (Component A) content of 6 to 50% by weight and an aromatic polycarbonate resin (Component B) content of 10 to 85% by weight.

12. The method of claim 1, wherein the regenerated resin composition (Component C) is a composition that contains
   (1) 30 to 96% by weight of an aromatic polycarbonate resin (Component C-1),
   (2) 3 to 40% by weight of a styrene-based resin (Component C-2-PS), and
   (3) 0.01 to 30% by weight of a flame retardant (Component C-3).

13. The method of claim 12, wherein the regenerated resin composition contains, as the flame retardant (Component C-3), 1 to 30% by weight of a phosphoric ester (Component C-3-a).

14. The method of claim 12, wherein the regenerated resin composition gives a molded article having a wet heat retention ratio of at least 60%.

15. The method of claim 12, wherein the regenerated resin composition gives a molded article having an impact value retention ratio of at least 60%.

16. The method of claim 12, wherein the regenerated resin composition gives a molded article that satisfies V-0 in a flame retardancy test according to UL-94.

* * * * *

UNITED STATES PATENT AND TRADEMARK OFFICE
CERTIFICATE OF CORRECTION

PATENT NO. : 7,045,555 B2 Page 1 of 1
APPLICATION NO. : 10/742388
DATED : May 16, 2006
INVENTOR(S) : Makoto Takagi It is certified that error appears in the above-identified patent and that said Letters Patent is hereby corrected as shown below:

Front Page, line 2 of item (62):
Please change "May 27, 2001" to --March 27, 2001--.

Signed and Sealed this

Fifth Day of December, 2006

JON W. DUDAS
*Director of the United States Patent and Trademark Office*